US010412567B1

(12) United States Patent
Tong et al.

(10) Patent No.: US 10,412,567 B1
(45) Date of Patent: Sep. 10, 2019

(54) SHORT-RANGE WIRELESS COMMUNICATION BASED ON INDIRECT TRANSMISSION OF COMMUNICATION PARAMETERS

(71) Applicant: BESTECHNIC (SHANGHAI) CO., LTD., Shanghai (CN)

(72) Inventors: Weifeng Tong, Shanghai (CN); Liang Zhang, Shanghai (CN); Lin Li, Shanghai (CN); Guanghui Yang, Shanghai (CN)

(73) Assignee: BESTECHNIC (SHANGHAI) CO., LTD., Shanghai (CN)

( * ) Notice: Subject to any disclaimer, the term of this patent is extended or adjusted under 35 U.S.C. 154(b) by 0 days.

(21) Appl. No.: 16/423,112

(22) Filed: May 27, 2019

(30) Foreign Application Priority Data

Sep. 29, 2018 (CN) .......................... 2018 1 1146196

(51) Int. Cl.
| | |
|---|---|
| *H04W 4/80* | (2018.01) |
| *H04W 76/10* | (2018.01) |
| *H04R 1/10* | (2006.01) |
| *H04W 84/12* | (2009.01) |

(52) U.S. Cl.
CPC ............ *H04W 4/80* (2018.02); *H04R 1/1016* (2013.01); *H04R 1/1025* (2013.01); *H04R 1/1041* (2013.01); *H04W 76/10* (2018.02); *H04R 2420/07* (2013.01); *H04W 84/12* (2013.01)

(58) Field of Classification Search
CPC ...... H04W 4/80; H04W 76/10; H04R 1/1025; H04R 1/1016; H04R 2420/07
USPC ................................................. 455/41.1–41.3
See application file for complete search history.

(56) References Cited

U.S. PATENT DOCUMENTS

| 2009/0046869 | A1* | 2/2009 | Griffin, Jr. | ............. H04R 5/033 381/74 |
| 2017/0289145 | A1* | 10/2017 | Boesen | ............... H04L 63/0861 |
| 2018/0262826 | A1* | 9/2018 | Ingram | ................ H04R 1/1025 |

* cited by examiner

*Primary Examiner* — Ayodeji O Ayotunde
(74) *Attorney, Agent, or Firm* — Bayes PLLC

(57) ABSTRACT

Embodiments of wireless audio systems and methods for wirelessly communicating audio information are disclosed herein. In one example, a wireless audio system includes a first and a second wireless headphones and a charging case. The first wireless headphone is configured to establish, with an audio source, a first short-range wireless connection and transmit communication parameters associated with the first short-range wireless connection to the charging case. The charging case is configured to receive the communication parameters associated with the first short-range wireless connection and transmit the communication parameters associated with the first short-range wireless connection to the second wireless headphone. The second wireless headphone is configured to receive the communication parameters associated with the first short-range wireless connection and establish, with the audio source, a second short-range wireless connection based on the communication parameters associated with the first short-range wireless connection.

26 Claims, 15 Drawing Sheets

SHORT-RANGE WIRELESS COMMUNICATION BASED ON INDIRECT TRANSMISSION OF COMMUNICATION PARAMETERS

CROSS-REFERENCE TO RELATED APPLICATIONS

This application claims the benefit of priority to Chinese Patent Application No. 201811146196.X, filed on Sep. 29, 2018, which is incorporated herein by reference in its entirety.

BACKGROUND

Embodiments of the present disclosure relate to wireless audio systems.

Loudspeakers, including headphones, have been widely used in daily life. Headphones are a pair of small loudspeaker drivers worn on or around the head over a user's ears, which convert an electrical signal to a corresponding sound.

Wired headphones, however, constrain the users' movement because of the wires (cords), and are particularly inconvenient during exercise. Conventional wireless headphones no longer need the wires between the headphones and the audio sources, but still require the wires between the left and right headphones.

SUMMARY

Embodiments of wireless audio systems and methods for wirelessly communicating audio information are disclosed herein.

In one example, a wireless audio system includes a first and a second wireless headphones and a charging case configured to charge the first and second wireless headphones. The first wireless headphone is configured to establish, with an audio source, a first short-range wireless connection and transmit communication parameters associated with the first short-range wireless connection to the charging case. The charging case is configured to receive the communication parameters associated with the first short-range wireless connection and transmit the communication parameters associated with the first short-range wireless connection to the second wireless headphone. The second wireless headphone is configured to receive the communication parameters associated with the first short-range wireless connection, and establish, with the audio source, a second short-range wireless connection based on the communication parameters associated with the first short-range wireless connection.

In another example, a wireless audio system includes a first and a second wireless headphones and a charging case configured to charge the first and second wireless headphones. The first wireless headphone includes a first wireless module configured to establish, with an audio source, a first short-range wireless connection and a second wireless module configured to transmit communication parameters associated with the first short-range wireless connection to the charging case. The charging case includes a third wireless module configured to receive the communication parameters associated with the first short-range wireless connection from the second wireless module of the first wireless headphone, and transmit the communication parameters associated with the first short-range wireless connection to the second wireless headphone based on a first type of short-range wireless communication. The second wireless headphone includes a fourth wireless module configured to receive the communication parameters associated with the first short-range wireless connection from the third wireless module of the charging case using the first type of short-range wireless communication, and a fifth wireless module configured to establish, with the audio source, a second short-range wireless connection based on the communication parameters associated with the first short-range wireless connection.

In still another example, a wireless audio system includes a first and a second wireless headphones and a charging case configured to charge the first and second wireless headphones. The first wireless headphone includes a first wireless module configured to establish, with an audio source, a first short-range wireless connection and a first contact interface configured to transmit communication parameters associated with the first short-range wireless connection to the charging case based on a wired communication. The charging case includes a second contact interface in contact with the first contact interface and configured to receive the communication parameters associated with the first short-range wireless connection from the first wireless headphone based on the wired communication and a third contact interface configured to transmit the communication parameters associated with the first short-range wireless connection to the second wireless headphone based on the wired communication. The second wireless headphone includes a fourth contact interface in contact with the third contact interface and configured to receive the communication parameters associated with the first short-range wireless connection from the charging case based on the wired communication and a second wireless module configured to establish, with the audio source, a second short-range wireless connection based on the communication parameters associated with the first short-range wireless connection.

In yet another example, a method for wirelessly communicating audio information is disclosed. The method includes establishing, by a first wireless headphone, a first short-range wireless connection with an audio source and transmitting, by the first wireless headphone, communication parameters associated with the first short-range wireless connection to a charging case. The method may also include transmitting by the charging case, the communication parameters associated with the first short-range wireless connection to a second wireless headphone and establishing, by the second wireless headphone, a second short-range wireless connection with the audio source based on the received communication parameters associated with the first short-range wireless connection.

This Summary is provided merely for purposes of illustrating some embodiments to provide an understanding of the subject matter described herein. Accordingly, the above-described features are merely examples and should not be construed to narrow the scope or spirit of the subject matter in this disclosure. Other features, aspects, and advantages of this disclosure will become apparent from the following Detailed Description, Figures, and Claims.

BRIEF DESCRIPTION OF THE DRAWINGS

The accompanying drawings, which are incorporated herein and form part of the specification, illustrate the presented disclosure and, together with the description, further serve to explain the principles of the disclosure and enable a person of skill in the relevant art(s) to make and use the disclosure.

Figure 1A:
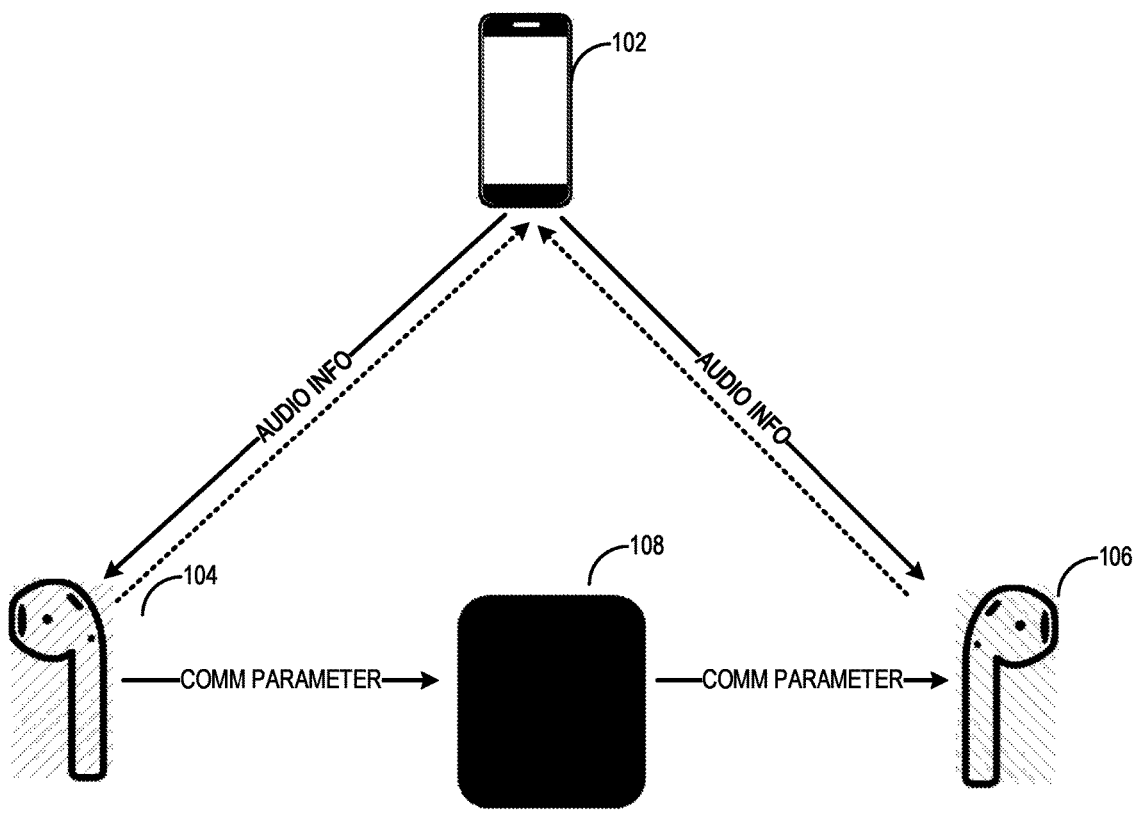
FIGS. 1A-1C are block diagrams illustrating an exemplary wireless audio system in accordance with various embodiments.

The presented disclosure is described with reference to the accompanying drawings. In the drawings, generally, like reference numbers indicate identical or functionally similar elements. Additionally, generally, the left-most digit(s) of a reference number identifies the drawing in which the reference number first appears.

DETAILED DESCRIPTION

Although specific configurations and arrangements are discussed, it should be understood that this is done for illustrative purposes only. It is contemplated that other configurations and arrangements can be used without departing from the spirit and scope of the present disclosure. It is further contemplated that the present disclosure can also be employed in a variety of other applications.

It is noted that references in the specification to "one embodiment," "an embodiment," "an example embodiment," "some embodiments," etc., indicate that the embodiment described may include a particular feature, structure, or characteristic, but every embodiment may not necessarily include the particular feature, structure, or characteristic. Moreover, such phrases do not necessarily refer to the same embodiment. Further, when a particular feature, structure or characteristic is described in connection with an embodiment, it is contemplated that such feature, structure or characteristic may also be used in connection with other embodiments whether or not explicitly described.

In general, terminology may be understood at least in part from usage in context. For example, the term "one or more" as used herein, depending at least in part upon context, may be used to describe any feature, structure, or characteristic in a singular sense or may be used to describe combinations of features, structures or characteristics in a plural sense. Similarly, terms, such as "a," "an," or "the," again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

True wireless stereo (TWS) headphones (also known as untethered headphones) is a type of wireless headphones that remove the wires between the left and right headphones. In some TWS headphones, a primary wireless headphone can simultaneously communicate with an audio source and a secondary wireless headphone. For example, the audio source transmits data (music, audio, or data packets) to the primary wireless headphone using BLUETOOTH, and the primary wireless headphone then forwards the data to the secondary wireless headphone. This approach can cause the high power consumption of the primary wireless headphone. Also, the physical structures of the human head between the left and right ears can affect the data transmission quality between the primary and secondary wireless headphones, such as causing lagging and/or high latency.

As will be disclosed in detail below, among other novel features, the wireless audio systems including a charging case disclosed herein can achieve "true wireless stereo" with improved data transmission quality, stability, and reduced headphone power consumption. In some embodiments of the present disclosure, the primary wireless headphone establishes a normal communication link (e.g., a short-range wireless connection) with the audio source to receive the audio data (e.g., stereo audio), while the secondary wireless headphone establishes a snoop communication link (e.g., another short-range wireless connection) with the audio source to snoop communications on the normal communication link and receive the audio data (e.g., the same audio data received by the primary wireless headphone) from the audio source as well. Having the secondary wireless headphone work in the snoop mode can reduce the power consumption of the primary wireless headphone because the primary wireless headphone no longer needs to forward the audio data to the secondary wireless headphone.

Moreover, one of the primary and secondary wireless headphones, which successfully establishes a normal communication link with the audio source, can transmit the communication parameters associated with the established normal communication link to a charging case based on successfully establishes the normal communication link. The charging case may then transmit the communication parameters to the other wireless headphone for the other wireless headphone to establish a snoop communication link (e.g., the same type of short-range wireless communication as the normal communication link).

In some embodiments, the charging case may use short-range communications to receive and/or transmit the communication parameters. For example, the charging case may use a wireless transceiver module to transmit and/or receive BLUETOOTH communication signals, BLUETOOTH Low Energy communication signals, amended BLUETOOTH communication signals, or Wi-Fi communication signals corresponding to the communication parameters to transmit the communication parameters. In some other embodiments, the charging case may use wired communications to receive and/or transmit the communication parameters. For example, the charging case may use contact interfaces connecting the charging case with the primary wireless headphone and the secondary wireless headphone to transmit electrical signals (e.g., currents or voltages) corresponding to the communication parameters to transmit the communication parameters. Using the charging case for data transmission can improve the data transmission's quality, stability and reduced the wireless headphone's power consumption.

Additional novel features will be set forth in part in the description which follows, and in part will become apparent to those skilled in the art upon examination of the following and the accompanying drawings or may be learned by production or operation of the examples. The novel features of the present disclosure may be realized and attained by practice or use of various aspects of the methodologies, instrumentalities, and combinations set forth in the detailed examples discussed below.

Figure 1B:
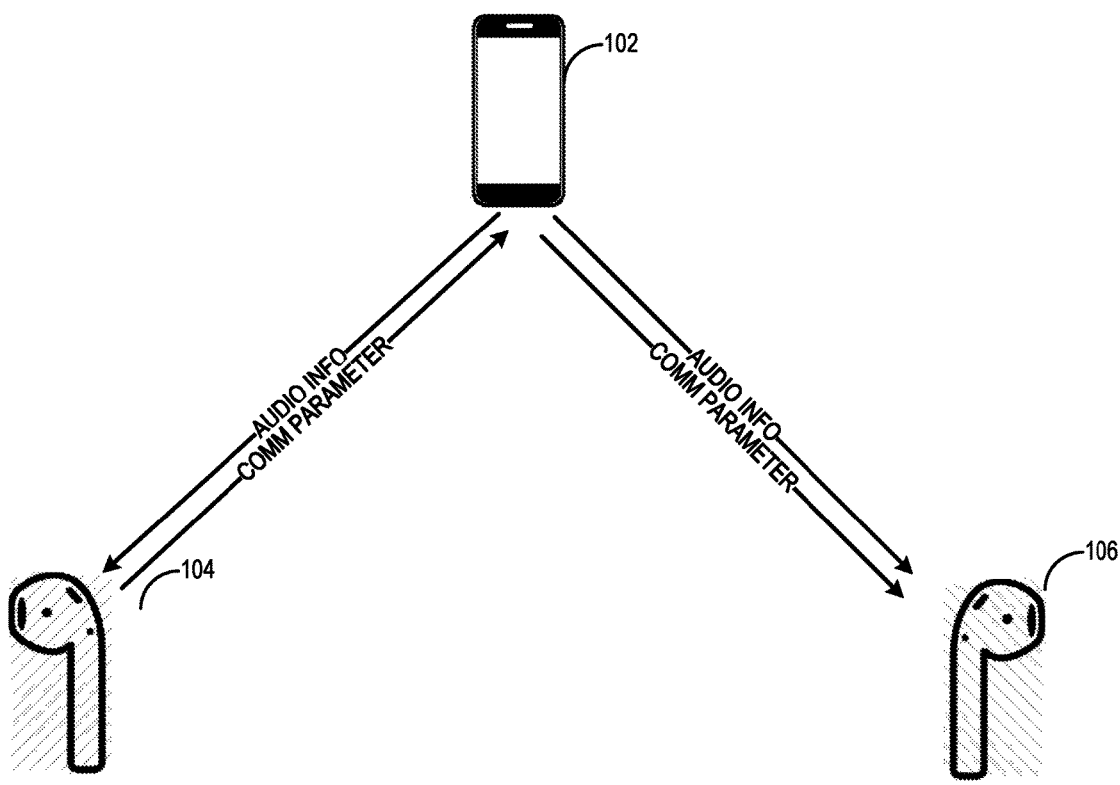
Figure 1C:
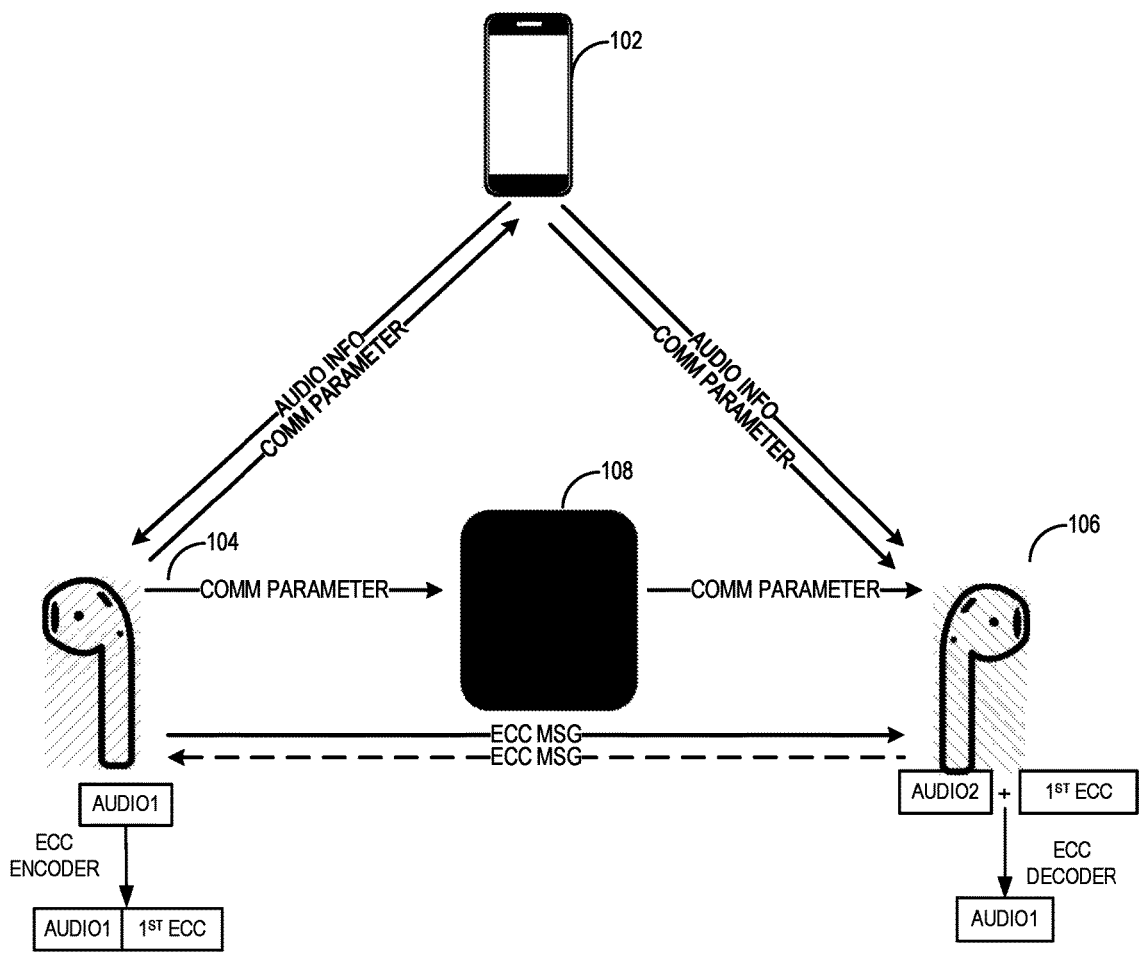

FIGS. 1A-1C are block diagrams illustrating exemplary wireless audio system 100 in accordance with various embodiments. In FIG. 1A, wireless audio system 100 may include an audio source 102, a primary wireless headphone 104, a secondary wireless headphone 106, and a charging case 108. Audio source 102 may be any suitable device that can provide audio information including, for example, music or voice in the digital or analog format. Audio source 102 may include, but is not limited to, a handheld device (e.g., dumb or smart phone, tablet, etc.), a wearable device (e.g., eyeglasses, wrist watch, etc.), a radio, a music player, an electronic musical instrument, an automobile control station, a gaming console, a television set, a laptop computer, a desktop computer, a netbook computer, a media center, a set-top box, a global positioning system (GPS), or any other suitable device. Primary wireless headphone 104 and secondary wireless headphone 106 may be a pair of loudspeakers that can be worn on or around the head over a user's ears. Primary wireless headphone 104 and secondary wireless headphone 106 may be any electroacoustic transducers that convert an electrical signal (e.g., representing the audio information provided by audio source 102) to a corresponding sound. In some embodiments, each primary wireless headphone 104 and secondary wireless headphone 106 may be an earbud (also known as earpiece) that can plug into the user's ear canal. In some embodiments, primary wireless headphone 104 and secondary wireless headphone 106 may be TWS headphones, which are individual units that are not physically held by a band over the head and/or electrically connected by a cord. Primary wireless headphone 104 and/or secondary wireless headphone 106 may be combined with a microphone to form a headset according to some embodiments. Charging case 108 may be any suitable device that can put energy into primary wireless headphone 104 and/or secondary wireless headphone 106, for example, a simple charger (e.g., a constant DC or pulsed DC power source, an AC-powered battery charger, etc.), a fast charger, a three-stage charger, an induction-powered charger, an intelligent charger (e.g., charger with a chip for charging smart batteries), a motion-powered charger, a pulse charger, a solar charger, a timer-based charger, a USB-based charger, an universal battery charger, a trickle charger, or any other suitable device. It is understood that although in FIG. 1A, wireless audio system 100 includes audio source 102, the pair of primary and secondary wireless headphones 104 and 106 and charging case 108, in some embodiments, charging case 108 may charge primary and secondary wireless headphones 104 and 106 simultaneously or separately.

Moreover, one of primary and secondary wireless headphones 104 and 106, which successfully receives the audio data from the audio source, can transmit an error correcting message including an error correcting code (ECC) based on the successfully-received audio data to the other wireless headphone. The ECC can be used to correct the error in the audio data received by the other wireless headphone without re-transmitting the audio data, thereby reducing the times of re-transmission and improving the system reliability.

The ECC may include, but not limited to, Reed-Solomon (RS) code, Bose-Chaudhuri-Hocquenghem (BCH) code, etc. In case secondary wireless headphone 106 does not successfully receive the audio information from audio source 102 (e.g., error found in the payload of a BLUETOOTH audio data packet), the ECC contained in the error correcting message from primary wireless headphone 104 may be used by secondary wireless headphone 106 to correct the audio information (e.g., the error found in the payload of the BLUETOOTH audio data packet). Also, the transmission of an error correcting message with an ECC can also serve as an ACK message indicative of the successful reception of the audio information by primary wireless headphone 104. Thus, when secondary wireless headphone 106 successfully receives the audio information from audio source 102 based on the ECC from primary wireless headphone 104, secondary wireless headphone 106 may transmit an ACK message to audio source 102 indicative of the successful receptions of the audio information by both primary and secondary wireless headphones 104 and 106. It is understood that secondary wireless headphone 106 may successfully receive the audio information from audio source 102 based on the ECC, either when secondary wireless headphone 106 successfully receives the audio information from audio source 102 without error at the first place (i.e., without the need of correction using the ECC) or when secondary wireless headphone 106 successfully corrects the audio information from audio source 102 based on the ECC. In either case, secondary wireless headphone 106 is considered as "successfully receiving the audio information from audio source 102 based on the ECC."

As shown in FIG. 1A, bidirectional communications may be established between audio source 102 and primary wireless headphone 104 and between audio source 102 and secondary wireless headphone 106. Communication parameters may be transmitted from primary wireless headphone 104 to charging case 108 and from charging case 108 to secondary wireless headphone 106. In some embodiments, a normal communication link may be established between audio source 102 and primary wireless headphone 104 using a short-range wireless communication (e.g., the BLUETOOTH communication or WiFi communication). That is, primary wireless headphone 104 may work in the normal mode. In the normal mode, primary wireless headphone 104 may receive audio information (e.g., in data packets) transmitted by a carrier wave from audio source 102 via the normal communication link. In some embodiments, audio information may be a stream of audio stereo information in the form of compressed or uncompressed stereo samples for first and second audio channels, such as left-channel audio information and right-channel audio information or the like. The normal communication link may be bidirectional such that primary wireless headphone 104 may transmit acknowledgment messages (ACK) back to audio source 102 in response to the reception of the audio information from audio source 102. As described below in detail, in some embodiments, primary wireless headphone 104 transmit negative acknowledgment (NACK) messages to audio source 102 in response to not successfully receiving the audio information from audio source 102. In some embodiments, the short-range wireless communication between audio source 102 and primary wireless headphone 104 is a unidirectional communication link in which primary wireless headphone 104 receives the audio information from audio source 102, but does not transmit data (e.g., NACK messages) back to audio source 102.

In some embodiments, a communication parameters transmission link may be established between primary wireless headphone 104 and charging case 108 and between charging case 108 and secondary wireless headphone 106 for transmitting the communication parameters associated with the normal communication link and/or ECC code from primary wireless headphone 104 to secondary wireless headphone 106 using a different or the same communication connection. In some embodiments, the communication parameters transmission link may be a short-range communication (e.g., BLUETOOTH communication, BLUETOOTH Low Energy communication, amended BLUETOOTH communication, or Wi-Fi communication) different from the type of short-range wireless communication of the normal link between primary wireless headphone 104 and audio source 102. In some other embodiments, the transmission of the communication parameters may be at a frequency lower than the frequency used for transmitting the audio information by audio source 102 (e.g., 2.4 GHz). For example, near-field magnetic induction (NFMI) communication may be used for transmitting the communication parameters. NFMI communication is a short-range wireless communication by coupling a tight, low-power, non-propagating magnetic field between devices. NFMI communication can contain transmission energy within the localized magnetic field, which does not radiate into free space. In some embodiments, the carrier wave frequency for NFMI communication is between about 5 MHz and about 50 MHz (e.g., between 5 MHz and 50 MHz), such as between 5 MHz and 40 MHz, between 5 MHz and 30 MHz, between 5 MHz and 20 MHz, between 5 MHz and 10 MHz, between 15 MHz and 50 MHz, between 25 MHz and 50 MHz, between 35 MHz and 50 MHz, and between 45 MHz and 50 MHz. In some embodiments, the carrier wave frequency is about 10 MHz (e.g., 10 MHz) or about 13.56 MHz (e.g., 13.56 MHz).

In some further embodiments, both the normal link and the communication parameters transmission link between primary wireless headphone 104 and charging case 108 and between charging case 108 and secondary wireless headphone 106 are the same type of short-range wireless communication (e.g., BLUETOOTH Low Energy communication). As described below in detail, in some still other embodiments, the communication parameters transmission link may be a wired communication (e.g., a bidirectional half-duplex communication). In some embodiments, the communication parameters may include an IP address or media access control (MAC) address of the audio source, encryption parameters, adaptive frequency-hopping (AFH) information, BLUETOOTH piconet information, first headphone MAC address, etc., and may be transmitted separately from the audio information.

Upon receiving the communication parameters from primary wireless headphone 104 (e.g., through charging case 108), secondary wireless headphone 106 can establish the snoop communication link with audio source 102 based on the communication parameters. For example, secondary wireless headphone 106 may pretend to be primary wireless headphone 104 so that audio source 102 does not recognize secondary wireless headphone 106 as a newly-connected device and thus, will not disconnect and reconnect with secondary wireless headphone 106.

In some embodiments, the snoop communication link may be established between audio source 102 and secondary wireless headphone 106 using the same short-range wireless communication between audio source 102 and primary wireless headphone 104 (e.g., the BLUETOOTH or WiFi) based on the communication parameters received from charging case 108 through the communication parameter transmission link. That is, secondary wireless headphone 106 may work in the snoop mode in which the connection with secondary wireless headphone 106 may not be known by audio source 102. In the snoop mode, secondary wireless headphone 106 may snoop (also known as "listen" or "eavesdrop") the communications between audio source 102 and primary wireless headphone 104 on the normal communication link. By snooping the communications between audio source 102 and primary wireless headphone 104, secondary wireless headphone 106 may also receive the same audio information primary wireless headphone 104 received (e.g., in data packets) transmitted by the carrier wave from audio source 102 via the snoop communication link. The snoop communication link may be bidirectional such that secondary wireless headphone 106 may transmit messages back to audio source 102 in response to the reception of the audio information from audio source 102. As described below in detail, the messages transmitted by secondary wireless headphone 106 may include, for example, acknowledgment (ACK) messages and NACK messages.

In some embodiments, audio information may be transmitted by audio source 102 according to the BLUETOOTH protocol at the working radio frequency (RF) band between 2,402 MHz and 2,480 MHz or between 2,400 MHz and 2,483.5 MHz (referred to herein as "2.4 GHz"). BLUETOOTH is a wireless technology standard for exchanging data over short distances, and the BLUETOOTH protocol is one example of short-range wireless communication protocols. In one example, audio source 102 may apply the advanced audio distribution profile (A2DP) of the BLUETOOTH protocol for transmitting the audio information. For example, based on the A2DP, a BLUETOOTH audio streaming of music or voice may be streamed from audio source 102 to primary and secondary wireless headphones 104 and 106 over BLUETOOTH connections. In some embodiments, audio information may be transmitted by audio source 102 according to the WiFi protocol at the working RF band of 2.4 GHz or 5 GHz. WiFi is a wireless technology for wireless local area networking based on the IEEE 802.11 standards, and the WiFi protocol (also known as the 802.11 protocol) is another example of short-range wireless communication protocols. It is understood that the transmission of the audio information by audio source 102 may be using any other suitable short-range wireless communication besides BLUETOOTH and WiFi.

In some embodiments, charging case 108 may also facilitate the pairing of primary wireless headphone 104 and/or secondary wireless headphone 106 with audio source 102. For example, charging case 108 may receive communication parameters associated with a first type of short-range wireless communication (e.g., BLUETOOTH or WiFi) or a wired communication (e.g., through connection of contact interfaces) from primary wireless headphone 104 and/or secondary wireless headphone 106 using a one-to-one mode and transmit the communication parameters to audio source 102 through a second type of wireless communication (e.g., NFMI) using a broadcasting mode for pairing primary wireless headphone 104 and/or secondary wireless headphone 106 with audio source 102. For another example, charging case 108 may receive communication parameters associated with the first type of short-range wireless communication (e.g., BLUETOOTH or WiFi) from audio source 102 using a one-to-one mode and transmit the communication parameters to primary wireless headphone 104 and/or secondary wireless headphone 106 through a second type of wireless communication (e.g., NFMI) using a broadcasting mode, or a wired communication (e.g., through connection of contact interfaces) for pairing primary wireless headphone 104 and/or secondary headphone 106 with audio source 102.

In some embodiments, charging case 108 may have the function of facilitating the pairing of primary wireless headphone 104 and/or secondary wireless headphone 106 with audio source 102 without the charging function. For example, charging case 108 may be a headphone holder that may use wired or wireless communication to communicate with primary wireless headphone 104 and/or secondary wireless headphone 106 and audio source 102 for pairing primary wireless headphone 104 and/or secondary wireless headphone 106 with audio source 102.

In some embodiments, as illustrated in FIG. 1B, similar to the setting in the example illustrated in FIG. 1A, primary wireless headphone 104 and secondary wireless headphone 106 may communicate with audio source 102 using the normal communication link (for the communication parameter transmitting headphone) or the snoop communication link (for the communication parameter receiving headphone). In the example illustrated in FIG. 1B, primary wireless headphone 104 may transmit the communication parameters associated with the normal communication link back to audio source 102 and/or sending a request for audio source 102 to transmit the communication parameters to secondary wireless headphone 106. Audio source 102 may transmit the communication parameters (e.g., broadcasting the communication parameters) to secondary wireless headphone 106 so that secondary wireless headphone to establish the snoop communication link with audio source 102 based on the communication parameters. In some embodiment, the communication parameter transmission link may use the same wireless protocol as the transmission of the audio source (e.g., using BLUETOOTH protocol). In some other embodiments, the communication parameter transmission link may use the same wireless protocol as the transmission of the audio source but at a higher or lower frequency than the baseband used for the transmission of the audio source (e.g., using an amended BLUETOOTH protocol). In a further embodiment, the communication parameter transmission link may use a different wireless protocol as the transmission of the audio source (e.g., using BLUETOOTH Low Energy protocol, WiFi protocol or NFMI protocol).

In some embodiments, as illustrated in FIG. 1C, similar to the setting in the example illustrated in FIG. 1A, primary wireless headphone 104 and secondary wireless headphone 106 may communicate with audio source 102 using the normal communication link (for the communication parameter transmitting headphone) or the snoop communication link (for the communication parameter receiving headphone), and primary wireless headphone 104 may transmit the communication parameters associated with the normal communication link to secondary wireless headphone 106 through charging case 108. In the example illustrated in FIG. 1C, one of primary and secondary wireless headphone 104 and 106 may directly transmit the ECC to the other wireless headphone based on successfully receives the audio information. For example, one of the primary and secondary wireless headphones, which successfully receives the audio data from the audio source, can transmit a first error correcting message including an error correcting code (ECC) based on the successfully-received audio data, or a second error correcting message including the audio information with or without the ECC to the other wireless headphone. The ECC can be used to correct the error in the audio data received by the other wireless headphone without re-transmitting the audio data. If the first error correcting message fails to correct the error in the audio data received by the other wireless headphone, the second error correcting message including the audio information may be transmitted from the wireless headphone that successfully receives the audio data to the other wireless headphone to correct the error in the audio data received by the other wireless headphone.

In another example, ECC may be encoded by a wireless headphone (e.g., primary wireless headphone 104 and/or secondary wireless headphone 106) that correctly receives the audio information from audio source 102 using the correctly received audio information (e.g., audio 1 in FIG. 1C). For example, primary wireless headphone 104 and secondary wireless headphone 106 may both receive the same audio information from audio source 102. One or both of primary and secondary wireless headphone 104 and 106 may correctly receive the audio information. The correctly receiving wireless headphone may generate the first ECC by encoding the correctly received audio information (e.g., using an encoder) and may transmit the first ECC to the other wireless headphone. The other wireless headphone may correct the wrongly received audio information (e.g., audio 2 in FIG. 1C which has errors in the audio data packet) by decoding the first ECC and the wrongly received audio information (e.g., using a decoder). In some embodiments, if the wrongly received audio information cannot be corrected by the first ECC, a second ECC message may be generated and transmitted by the correctly receiving wireless headphone. In some embodiments, the second ECC message may include the correctly received audio information but not the first ECC. In some other embodiments, the second ECC message may include both the correctly received audio information and the first ECC.

It is to be understood that the communication parameter transmitting headphone can be switched between primary and secondary wireless headphone 104 and 106 based on which wireless headphone establishes the normal communication link with audio source 102 first. In some embodiments, which wireless headphone establishes the normal communication link with audio source depends on the signal quality of primary and secondary wireless headphone.

Figure 2A:
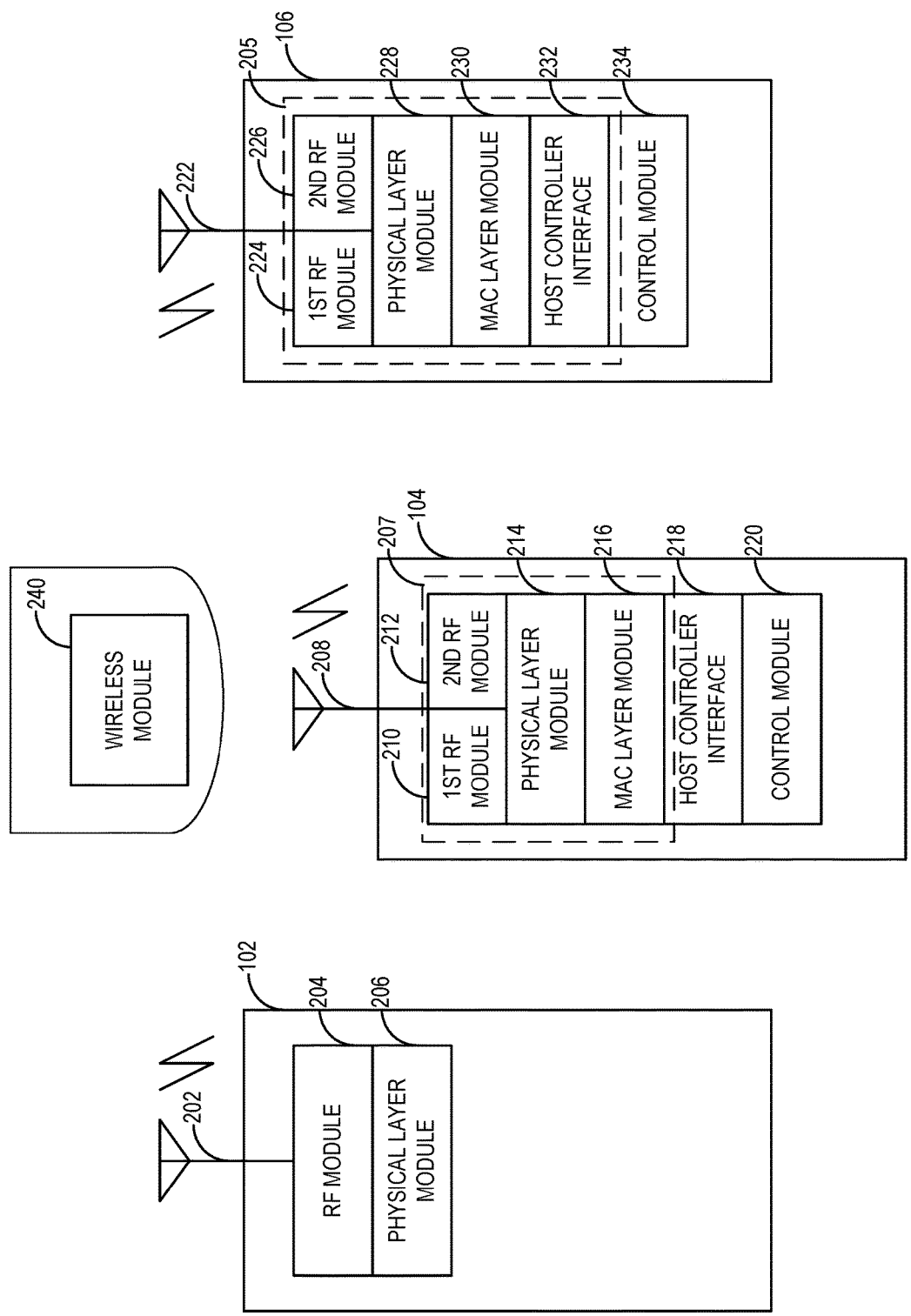
FIGS. 2A-2C are detailed block diagrams of the exemplary wireless audio system in accordance with various embodiments.
Figure 2B:
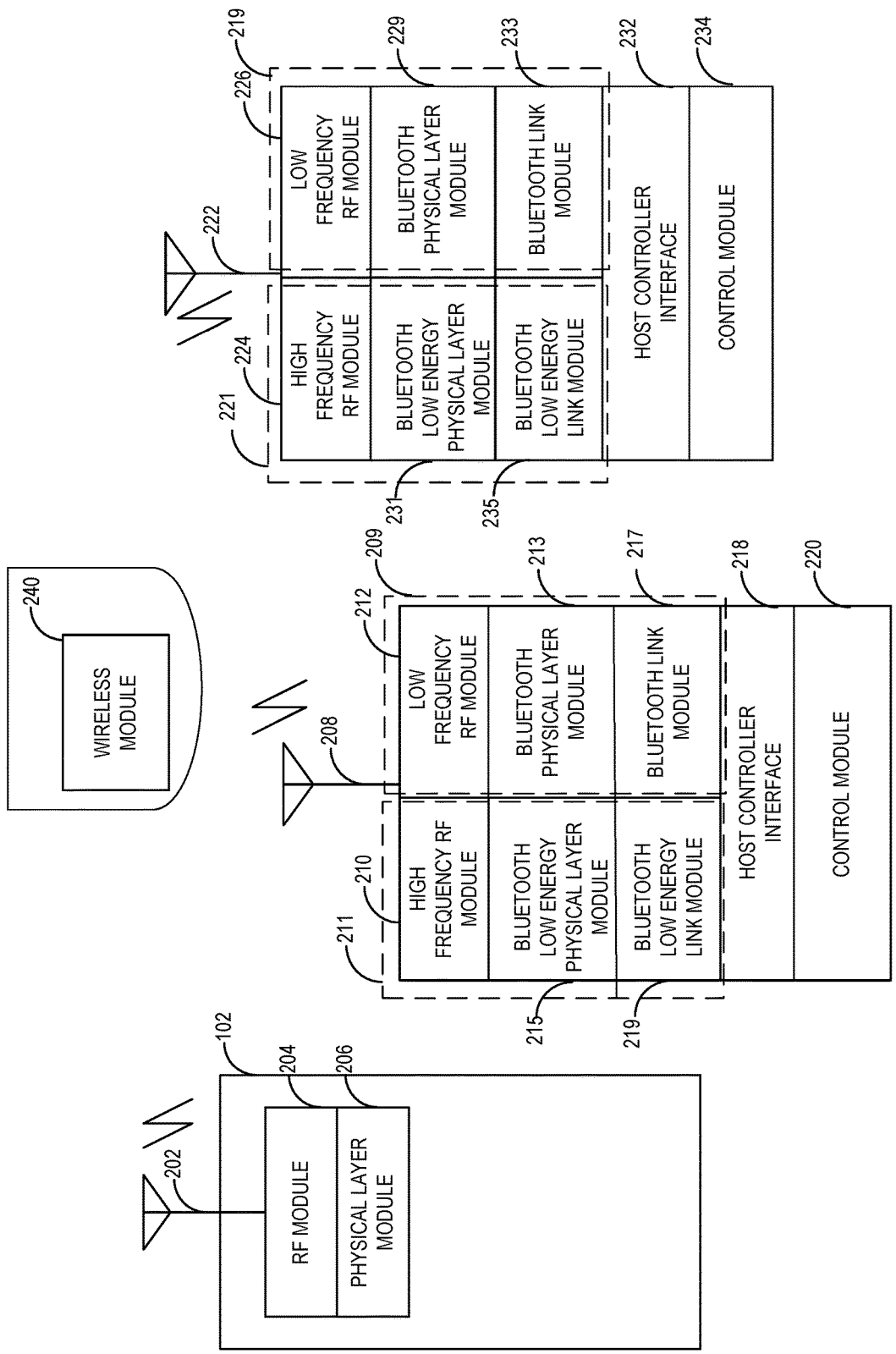
Figure 2C:
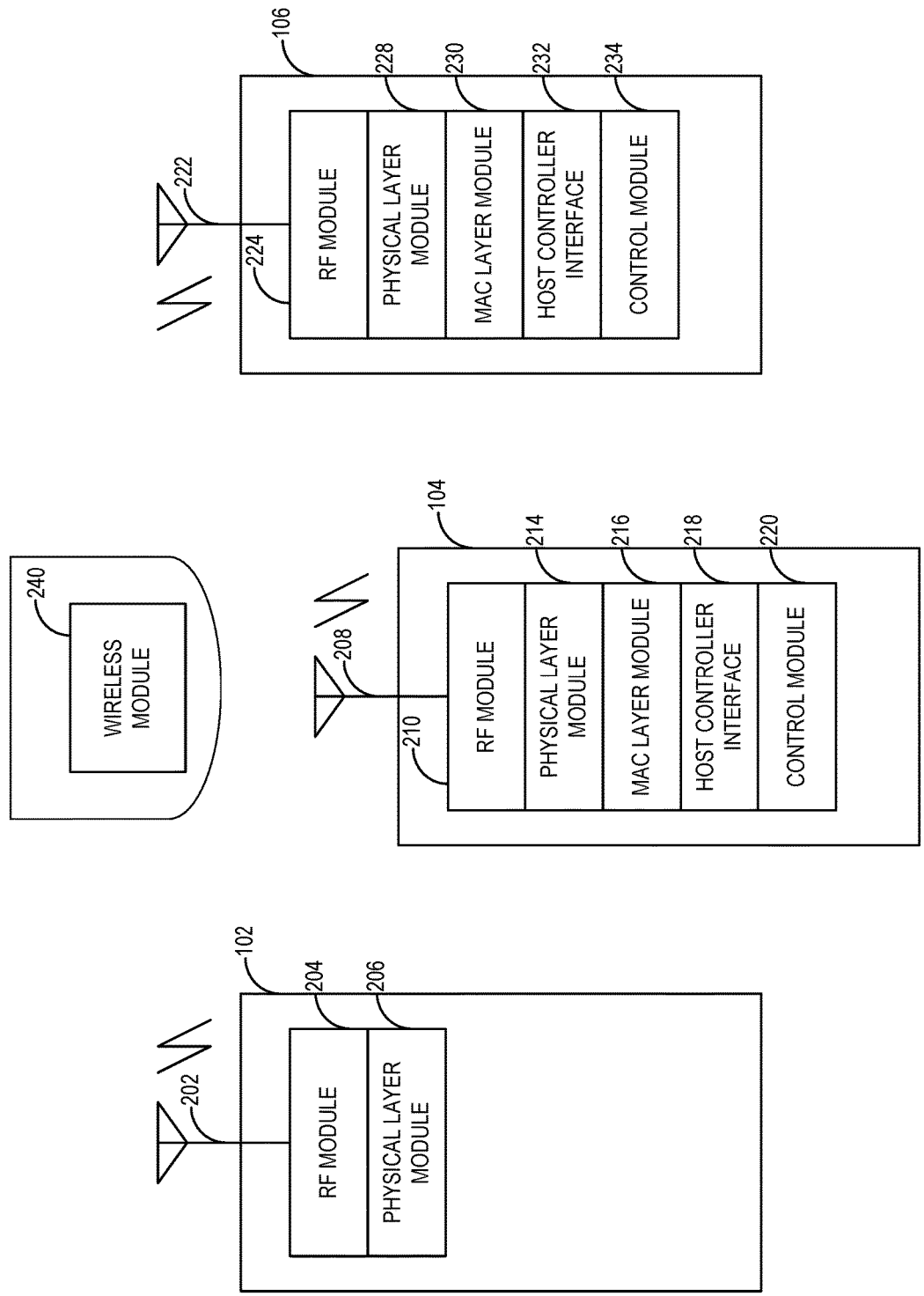

FIGS. 2A-2C are detailed block diagrams of the exemplary wireless audio system 100 in FIG. 1A in accordance with various embodiments. In the example illustrated in FIG. 2A, audio source 102 in this example includes an antenna 202, a radio-frequency (RF) module 204 and a physical layer module 206. It is understood that additional module(s) may be included in audio source 102, either in the same integrated circuit (IC) chip in which RF module 204 and physical layer module 206 are formed or in a separate IC chip.

Antenna 202 may include an array of conductors for transmitting and receiving radio waves at one or more RF bands corresponding to RF module 204. For example, antenna 202 may transmit audio information modulated by a carrier wave using RF module 204. As described above, the audio information may be any music and/or voice information provided by audio source 102. For example, the audio information may be a stream of audio stereo information in the form of compressed or uncompressed stereo samples for first and second audio channels, such as left-channel audio information and right-channel audio information or the like. In some embodiments, the audio information may be mono audio information in a single audio channel or audio information in more than two separate audio channels (e.g., left, central, and right channels). Antenna 202 may also receive the messages modulated by a carrier wave. For example, the messages may be any messages used for acknowledging the reception of the audio information by primary wireless headphone 104 or secondary wireless headphone 106, such as ACK and NACK messages.

RF module 204 and physical layer module 206 may be in the same IC chip that implements a short-range wireless communication protocol, such as the BLUETOOTH protocol or WiFi protocol. RF module 204 may be configured to modulate the audio information using the carrier wave at a frequency, for example, at 2.4 GHz for BLUETOOTH or WiFi communication, and transmit the audio information at the frequency via antenna 202. RF module 204 may be further configured to receive and demodulate the messages and/or the audio information (e.g., the voice information during voice calls) from the carrier wave at the same frequency, for example, at 2.4 GHz. Physical layer module 206 may be configured to generate the physical link (baseband) between audio source 102 and primary wireless headphone 104 (and secondary wireless headphone 106 even though audio source 102 may not be aware of the connection with secondary wireless headphone 106) according to the short-range wireless communication protocol. For example, physical layer module 206 may generate baseband packets (e.g., BLUETOOTH packets) based on the music and/or voice data (payload) and perform error correction using any known methods, such as forward error correction (FEC) and automatic repeat request (ARQ).

In some embodiments, the transmission of the audio information may occur at the audio data packet level in time slots. For example, according to the standard BLUETOOTH protocol, the physical channel of the BLUETOOTH connection is divided into time slots, each of which has the same duration (e.g., 625 μs). RF module 204 in conjunction with antenna 202 may transmit an audio data packet (N) in a time slot (N). Based on the receptions of the audio data packet (N) in the time slot (N) at primary wireless headphone 104 and secondary wireless headphone 106, in the subsequent time slot (N+1), RF module 204 in conjunction with antenna 202 may receive a message from primary wireless headphone 104 or secondary wireless headphone 106 alone, or messages from both primary wireless headphone 104 and secondary wireless headphone 106, which are generated in response to the reception status of the audio data packet (N) in the time slot (N). It is understood that additional components, although not shown in FIG. 2, may be included in audio source 102.

Primary wireless headphone 104 in this example may include a wireless module 207 (e.g., a primary wireless transceiver) configured to receive the audio information transmitted by audio source 102 and transmit acknowledgment messages (e.g., ACK or NACK) to audio source 102 indicative of the successful reception of the audio information or not. The wireless module 207 may be further configured to transmit to (when working as a communication parameter transmitting headphone) and/or receive from, charging case 108 (when working as a communication parameter receiving headphone), the communication parameters. Primary wireless headphone 104 may include other components, such as an enclosure, speakers, and a microphone (not shown). Primary wireless headphone 104 may include an antenna 208, wireless module 207 that may include a first RF module 210, a second RF module 212, a physical layer module 214, and a MAC layer module 216, a host controller interface (HCI) 218, and a control module 220. Some or all of the modules mentioned above may be integrated in the same IC chip to reduce the chip size and/or power consumption. Primary wireless headphone 104 may present at least part of the audio information received from audio source 102 to the user via one of the user's ear. For example, the speaker of primary wireless headphone 104 may play music and/or voice based on the entire audio information or one audio channel of the audio information.

Antenna 208 may include an array of conductors for transmitting and receiving radio waves at two or more RF bands corresponding to first RF module 210 and second RF module 212. First RF module 210 may be configured to receive, from audio source 102, audio information and transmit, to audio source 102, acknowledgment messages (e.g., ACK and NACK) via antenna 208. Second RF module 212 may be configured to transmit to and/or receive from, charging case 108, the communication parameters via antenna 208.

In some embodiments, the first frequency used for the communications between audio source 102 and primary wireless headphone 104 is a "high" RF, such as 2.4 GHz used in BLUETOOTH or WiFi communication; the second frequency used for the communications between primary wireless headphone 104 and charging case 108 is a "low" RF, such as between 5 MHz and 50 MHz for NFMI communication. Both first RF module 210 and second RF module 212 may implement substantially the same short-range wireless communication protocol for short-range wireless communications at different RF bands. For example, first RF module 210 may implement a first short-range wireless communication protocol (e.g., the BLUETOOTH protocol or WiFi protocol), and second RF module 212 may implement a second short-range wireless communication protocol amended from the first short-range wireless communication protocol (e.g., the amended BLUETOOTH or amended WiFi protocol). The second short-range wireless communication protocol may be substantially the same as the first short-range wireless communication protocol except for the carrier wave frequency (and any specification related to the carrier wave frequency).

In some embodiments, first RF module 210 may operate at about 2.4 GHz (e.g., 2.4 GHz). In some embodiments, second RF module 212 may operate between about 5 MHz (e.g., 5 MHz) and about 50 MHz (e.g., 50 MHz) for NFMI communication. For example, second RF module 212 may operate at about 10 MHz (e.g., 10 MHz). In some embodiments, second RF module 212 may implement the frequency-hopping spread spectrum (FHSS) technique, such that the second frequency (low RF) may include a plurality of frequencies based on FHSS. For example, second RF module 212 may implement the amended BLUETOOTH protocol and use the FHSS specification in the amended BLUETOOTH protocol. FHSS can further reduce signal interference.

In some embodiments, RF module 210 and 212 may operate at the same frequency (e.g., at about 2.4 GHz). In some embodiments, primary wireless headphone 104 may only include one RF frequency module and may use the RF frequency module for both the communication between audio source 102 and primary wireless headphone 104 and the communication between primary wireless headphone 104 and charging case 108. For example, primary wireless headphone 104 may only include first RF module 210 and may receive audio information from audio source 102 based on BLUETOOTH communication and transmit the communication parameters to charging case 108 based on a BLU- ETOOTH Low Energy communication. In some other embodiments, as illustrated in FIG. 2B which will be disclosed in detail below, primary wireless headphone 104 may include two wireless modules (e.g., wireless module 209 and 211). For example, the different wireless modules may include different RF modules, different physical layers and different MAC layers to implement different types of short-range communication. As will be disclosed in detail below, primary wireless headphone 104 may use different wireless modules to communicate with audio source 102 and charging case 108 respectively. For example, primary wireless headphone 104 may communicate with audio source 102 using wireless module 211 based on a first type of wireless communication and communicate with charging case 108 using wireless module 209 based on a second type of short-range wireless communication.

Physical layer module 214 may be configured to generate the physical links (baseband) between audio source 102 and primary wireless headphone 104 according to the short-range wireless communication protocol and the amended short-range wireless communication protocol used by first RF module 210 and second RF module 212, respectively. For example, physical layer module 214 may generate baseband packets (e.g., BLUETOOTH packets) based on the music and/or voice data (payload) and perform error correction using any known methods, such as FEC and ARQ. MAC layer module 216 may be configured to generate the logical data channel links between audio source 102 and primary wireless headphone 104 according to the short-range wireless communication protocol and between primary wireless headphone 104 and charging case 108 according to the amended short-range wireless communication protocol used by first RF module 210 and second RF module 212, respectively. For example, MAC layer module 216 may generate link control channel, link manager channel, user asynchronous channel, user isochronous channel, and user synchronous channel based on the BLUETOOTH protocol (and the amended BLUETOOTH protocol). HCI 218 may be configured to provide a common interface to physical layer module 214 and MAC layer module 216 and access to hardware status and control registers. For example, when implementing the BLUETOOTH protocol (and the amended BLUETOOTH protocol), HCI 218 may provide a uniform method of accessing the BLUETOOTH baseband capabilities. In some embodiments, HCI 218 may include two HCI that works with RF module 210 and 212, respectively.

As described above, primary wireless headphone 104 can either be a communication parameter transmitting headphone or a communication parameter receiving headphone. In some embodiments, control module 220 may control primary wireless headphone 104 to switch between the communication parameter transmitting headphone and the communication parameter receiving headphone. In some embodiments, control module 220 may determine whether to switch the communication parameter headphone mode of primary wireless headphone 104 based on one or more parameters associated with primary wireless headphone 104 and/or secondary wireless headphone 106, such as signal quality. In one example, control module 220 may determine whether the signal quality (e.g., signal-to-noise ratio (SNR) or received signal strength indicator (RSSI)) is above a threshold and cause primary wireless headphone 104 to switch to a different communication parameter headphone mode. That is, in some embodiments, the wireless headphone with the relatively poor signal quality may be used as the communication parameter transmitting headphone, while the wireless headphone with the relatively good signal quality may be used as the communication parameter receiving headphone, so that the ACK/NACK messages transmitted by the communication parameter receiving headphone can be more easily received by audio source 102. In some embodiments, the wireless headphone with the relatively poor signal quality may be used as the communication parameter receiving headphone, while the wireless headphone with the relatively good signal quality may be used as the communication parameter transmitting headphone.

Control module 220 may be further configured to control the generation of the communication parameter based on the successfully received audio information when primary wireless headphone 104 is working as a communication parameter transmitting headphone or control the establishment of the snoop communication link when primary wireless headphone 104 is working as a communication parameter receiving headphone. When working as the communication parameter receiving headphone, control module 220 may be further configured to determine whether to transmit an ACK message or a NACK message to audio source 102 depending on various factors (e.g., whether the audio information is received successfully through the normal communication link).

In some embodiments, when working as the communication parameter transmitting headphone, control module 220 may still be configured to generate a partial communication parameters and control first RF module 210 and/or second RF module 212 to transmit the partial communication parameters to charging case 108 in response to, for example, the disconnection of the snooping communication link for secondary wireless headphone 106, or the re-establishment of the normal communication link for primary wireless headphone 104. For example, the partial communication parameters may include at least the encryption parameters for the connected normal communication link in response to secondary wireless headphone lost connection with audio source 102, or encryption parameters for the re-established normal communication link in response to primary wireless headphone 104 being disconnected with audio source 102 and re-establishing a new normal communication link with audio source 102.

Secondary wireless headphone 106 in this example may include a wireless module 205 (e.g., a secondary wireless transceiver) configured to receive (snoop/sniff) the audio information transmitted by audio source 102 and transmit to or receive from charging case 108, communication parameters associated with the normal communication link. Secondary wireless headphone 106 may include other components, such as an enclosure, speakers, and a microphone (not shown). Secondary wireless headphone 106 may include an antenna 222, wireless module 205 that may include a first RF module 224, a second RF module 226, a physical layer module 228, a MAC layer module 230, and an HCI 232, and a control module 234. Some or all of the modules mentioned above may be integrated in the same IC chip to reduce the chip size and/or power consumption. Secondary wireless headphone 106 may present at least part of the audio information to the user via one of the user's ear. For example, the speaker of secondary wireless headphone 106 may play music and/or voice based on the audio information or one audio channel of the audio information.

In this example, secondary wireless headphone 106 has the same hardware structures as primary wireless headphone 104. The functions of each module mentioned above in secondary wireless headphone 106 are the same as the counterparts in primary wireless headphone 104 and thus, will not be repeated. Different from primary wireless headphone 104, secondary wireless headphone 106 in this example works in the snoop mode, so that audio source 102 may not recognize the connection with secondary wireless headphone 106. To enable secondary wireless headphone 106 to work in the snoop mode, in some embodiments, charging case 108 may transmit, to second RF module 226 of secondary wireless headphone 106, one or more communication parameters associated with the short-range wireless communication protocol used between audio source 102 and primary wireless headphone 104 (e.g., the normal communication link). The communication parameters may include any parameters necessary for enabling secondary wireless headphone 106 to snoop the communications between audio source 102 and primary wireless headphone 104, such as the address of audio source 102 (e.g., the IP address or MAC address), encryption parameters, adaptive frequency-hopping (AFH) information, BLUETOOTH piconet information, etc., and may be transmitted separately from the audio information.

As described above, similar to control module 220 of primary wireless headphone 104, control module 234 of secondary wireless headphone 106 may control secondary wireless headphone 106 to switch between the communication parameter transmitting headphone and the communication parameter receiving headphone. The switch may be determined based on one or more parameters, such as the relative signal quality between primary wireless headphone 104 and secondary wireless headphone 106. For example, both control modules 220 and 234 may work together to switch the communication parameter headphone modes of primary wireless headphone 104 and secondary wireless headphone 106 to improve the overall performance of the pair of wireless headphones 104 and 106 as described above in detail.

Control module 234 may be further configured to control the generation of the communication parameter based on the successfully received audio information when secondary wireless headphone 106 is working as a communication parameter transmitting headphone or control the establishment of the snoop communication link when secondary wireless headphone 106 is working as a communication parameter receiving headphone. When working as the communication parameter receiving headphone, control module 234 may be further configured to determine whether to transmit an ACK message or a NACK message to audio source 102 depending on various factors (e.g., whether the audio information is received successfully through the normal communication link).

In some embodiments, when working as the communication parameter transmitting headphone, control module 234 may still be configured to generate a partial communication parameters and control first RF module 224 and/or second RF module 226 to transmit the partial communication parameters to charging case 108 in response to, for example, the disconnection of the snooping communication link for primary wireless headphone 104, or the re-establishment of the normal communication link for secondary wireless headphone 106. For example, the partial communication parameters may include at least the encryption parameters for the connected normal communication link in response to primary wireless headphone 104 lost connection with audio source 102, or encryption parameters for the re-established normal communication link in response to secondary wireless headphone 106 being disconnected with audio source 102 and re-establishing a new normal communication link with audio source 102.

Charging case 108 in this example may include a wireless transceiver (a third wireless transceiver) configured to receive the communication parameter transmitted by the communication parameter transmitting headphone and transmit the communication parameter to the communication parameter receiving headphone. Charging case 108 may include other components, such as a charging circuit for charging primary wireless headphone 104 and secondary wireless headphone 106, a battery for storing electrical power, a charging port for charging case 108, and headphone holders for holding primary wireless headphone 104 and secondary wireless headphone 106 while charging. In some embodiments, charging case 108 may include a wireless module 240. In some embodiments, wireless module 240 may optionally include an RF module, a physical layer module, a MAC layer module, an HCI, a control module and/or other suitable modules, so long as wireless module 240 can perform functions disclosed herein. Some or all of the modules mentioned above may be integrated in the same IC chip to reduce the chip size and/or power consumption. Charging case 108 may charge primary wireless headphone 104 and secondary wireless headphone 106 simultaneously or individually. For example, charging case 108 may charge primary wireless headphone 104 and secondary wireless headphone 106 at the same time when both of the headphones are inserted into the headphone holders of charging case 108, or charging case 108 may charge primary wireless headphone 104 or secondary wireless headphone 106 one at a time when only one of the headphones is inserted into the headphone holder. In some embodiments, charging case 108 may be charged by another power source, store the electrical power and charge primary wireless headphone 104 and secondary wireless headphone 106 using the stored electrical power.

In some embodiments, charging case 108 may include a memory device that can store the communication parameter received from the communication parameter transmitting headphone temporarily or permanently. For example, charging case 108 may include a random-access memory (RAM), a read-only memory (ROM), a semiconductor memory or any suitable memory device that can store the communication parameters. In some embodiments, in response to the communication parameter receiving headphone lost the snoop connection with the audio source, charging case 108 may transmit re-transmit the communication parameters or a partial communication parameter (e.g., encryption parameters) based on the communication parameter stored in the memory device of charging case 108.

Similar to second/low RF module 212, wireless module 240 of charging case 108 may implement the second short-range wireless communication protocol amended from the first short-range wireless communication protocol (e.g., the amended BLUETOOTH, amended WiFi protocol or BLUETOOTH Low Energy). The second short-range wireless communication protocol may be substantially the same as the first short-range wireless communication protocol except for the carrier wave frequency (and any specification related to the carrier wave frequency).

Although in FIG. 2A, the same physical layer module, MAC layer module, and HCI are used for both first and second RF modules 210 and 212 or 224 and 226, it is understood that in some embodiments, each of first and second RF modules 210 and 212 or 224 and 226 may have its own physical layer module, MAC layer module, and/or HCI. In other words, each of primary and secondary headphones 104 and 106 may include two physical layer modules, two MAC layer modules, and/or two HCIs. As a result, two different types of short-range wireless communications can be implemented by each of primary and secondary wireless headphones 104 and 106. In some embodiments, second RF modules 212 and 226 and their respective physical layer modules, MAC layers modules, and/or HCIs are used to implement WiFi communication or NFMI communication between the communication parameter transmitting headphone and charging case 108.

For example, in the example illustrated in FIG. 2B, each of primary and secondary wireless headphones 104 and 106 may include two wireless modules respectively (e.g., primary wireless headphone 104 may include two wireless modules 209 and 211, and secondary wireless headphone 106 may include another two wireless modules wireless module 219 and 221). Each wireless module includes a separate physical layer module, MAC layer module, and link module. Audio source 102 and charging case 108 in this example may have the same hardware structure as the example illustrated in FIG. 2A and thus, will not be repeated herein.

Primary wireless headphone 104 in this example may include a wireless transceiver (primary wireless transceiver) configured to receive the audio information transmitted by audio source 102 at the first frequency and transmit the communication parameters associated with the communication link between primary wireless headphone 104 and audio source 102 to charging case 108 at a second frequency. Primary wireless headphone 104 may include other components, such as an enclosure, speakers, and a microphone (not shown). Primary wireless transceiver may include an antenna 208, a high RF module 210, a low RF module 212, wireless module 209 that includes a Bluetooth physical layer module 213 a and a Bluetooth link module 217, and wireless module 211 that includes Bluetooth low energy physical layer module 215 and a Bluetooth low energy link module 219, a host controller interface (HCI) 218, and a control module 220. In some embodiments, HCI 218 may be configured to transport commands and events between the host and controller elements of the protocol stack based on Bluetooth link or Bluetooth low energy link and a media access control (MAC) layer module (not shown). Some or all of the modules mentioned above may be integrated in the same IC chip to reduce the chip size and/or power consumption.

Antenna 208 may include an array of conductors for transmitting and receiving radio waves at two or more RF bands corresponding to high RF module 210 and low RF module 212. High RF module 210 may be configured to receive, from audio source 102, the audio information at the first frequency via antenna 208. Low RF module 212 may be configured to transmit, to charging case 108, the communication parameters at a second frequency lower than the first frequency via antenna 208. As referred to herein, the first frequency used for the communication between audio source 102 and primary wireless headphone 104 is a "high" RF, such as 2.4 GHz used for Bluetooth or WiFi communication; the second frequency used for communication used for transmitting the communication parameters is a "low" RF, such as between 5 MHz and 50 MHz for NFMI communication. Both high RF module 210 and low RF module 212 may implement substantially the same short-range wireless communication protocol for short-range wireless communications at different RF bands. For example, high RF module 210 may implement a first short-range wireless communication protocol (e.g., the Bluetooth protocol or WiFi protocol), and low RF module 212 may implement a second short-range wireless communication protocol amended from the first short-range wireless communication protocol (e.g., the amended Bluetooth or amended WiFi protocol). The second short-range wireless communication protocol may be substantially the same as the first short-range wireless communication protocol except for the carrier wave frequency (and any specification related to the carrier wave frequency).

In some embodiments, high RF module 210 may operate at about 2.4 GHz (e.g., 2.4 GHz). In some embodiments, low RF module 212 may operate between about 5 MHz (e.g., 5 MHz) and about 50 MHz (e.g., 50 MHz) for NFMI communication. For example, low RF module 212 may operate at about 10 MHz (e.g., 10 MHz). In some embodiments, low RF module 212 may implement the frequency-hopping spread spectrum (FHSS) technique, such that the second frequency (low RF) may include a plurality of frequencies based on FHSS. For example, low RF module 212 may implement the amended Bluetooth protocol and use the FHSS specification in the amended Bluetooth protocol. FHSS can further reduce signal interference.

Wireless module 209 and 211 may be configured to generate the physical links (baseband) between audio source 102 and primary wireless headphone 104 and between primary wireless headphone 104 and charging case 108 according to the short-range wireless communication protocol and the amended short-range wireless communication protocol used by high RF module 210 and low RF module 212, respectively. In some embodiment, the communication protocol may be Bluetooth. For example, Bluetooth physical layer module 213 and/or Bluetooth low energy physical layer module 215 may generate baseband packets (e.g., Bluetooth packets) based on the music and/or voice data (payload) and perform error correction using any known methods, such as FEC and ARQ through a Bluetooth physical layer module. In another example, Bluetooth physical layer module 213 and/or Bluetooth low energy physical layer module 215 may also generate/extract communication parameters associated with the communication link between primary wireless headphone 104 and audio source 102 based on a Bluetooth Low Energy (BLE) module.

In some embodiments, Bluetooth physical layer module 213 and/or Bluetooth low energy physical layer module 215 may transmit signals at a symbol rate higher than 1 Msymbol/s. For example, Bluetooth physical layer module 213 and/or Bluetooth low energy physical layer module 215 may transmit signals at a symbol rate of 1.5 Msymbol/s. High transmission symbol rate may reduce the communication gap, and thus may reduce the power consumption. Also, the reduction of the communications gap may further increase the reliability of communication.

Wireless module 209 and 211 may also be configured to generate the logical data channel links between audio source 102 and primary wireless headphone 104 and between primary wireless headphone 104 and charging case 108 according to the short-range wireless communication protocol and the amended short-range wireless communication protocol used by high RF module 210 and low RF module 212, respectively. In some embodiments, HCI 232 may be configured to transport commands and events between the host and controller elements of the protocol stack based on Bluetooth link or Bluetooth low energy link and a media access control (MAC) layer module (not shown). For example, Bluetooth link module 217 and Bluetooth low energy link module 219 may generate link control channel, link manager channel, user asynchronous channel, user isochronous channel, and user synchronous channel based on the Bluetooth protocol (and the amended Bluetooth protocol) or Bluetooth Low Energy protocol. In some embodiments, Bluetooth link module 217 and Bluetooth low energy link module 219 may further control the modes of operation during the connection state. HCI 232 may be optionally included in primary wireless headphone 104 and may be configured to provide a common interface to Bluetooth physical layer module 213 and Bluetooth low energy physical layer module 215, and Bluetooth link module 217 and Bluetooth low energy link module 219 and access to hardware status and control registers. For example, when implementing the Bluetooth protocol (and the amended Bluetooth protocol), HCI 232 may provide a uniform method of accessing the Bluetooth baseband capabilities.

In some embodiments, similar to the example illustrated in FIG. 2A, control module 220 may control primary wireless headphone 104 to switch to the secondary mode to become a "secondary" headphone.

Secondary wireless headphone 106 in this example may include a wireless transceiver (secondary wireless transceiver) configured to snoop the audio information from audio source 102 at the first frequency (high RF, e.g., 24 GHz) and/or the second frequency (low RF, e.g., 10 MHz), and receive communication parameters using the other frequency. Secondary wireless headphone 106 may include other components, such as an enclosure, speakers, and a microphone (not shown). Secondary wireless transceiver may include an antenna 222, a high RF module 224, a low RF module 226, a wireless module 223 that includes a Bluetooth physical layer module 229 and a Bluetooth link module 233, and a wireless module 221 that includes a Bluetooth low energy physical layer module 231 and a Bluetooth low energy link module 235, a host controller interface (HCI) 232, and a control module 234. Some or all of the modules mentioned above may be integrated in the same IC chip to reduce the chip size and/or power consumption.

In this example, secondary headphone 106 has the same hardware structures as primary wireless headphone 104. The functions of each module mentioned above in secondary wireless headphone 106 are the same as the counterparts in primary wireless headphone 104 and thus, will not be repeated.

As described above, similar to control module 220 of primary wireless headphone 104, control module 234 of secondary wireless headphone 106 may switch secondary wireless headphone 106 into the primary mode to become a "primary" headphone.

In another embodiment, as shown in FIG. 2C, primary wireless headphone 104 and secondary wireless headphone 106 may have one wireless module (e.g., wireless module 225 that may include RF module 210, physical layer module 214, and MAC layer module 216, and wireless module 227 that may include RF module 224, physical layer module 228, and MAC layer module 230) for transmitting and/or receiving the communication parameters and receiving audio information from audio source 102. For example, RF modules 210 and 224 of wireless module 225 and 227 may use any of the BLUETOOTH communication, BLUETOOTH Low Energy communication, WIFI communication or NFMI communication to transmit and/or receive the communication parameters and receive audio information from audio source 102 as disclosed above. The rest structure of wireless headphone 104 and 106 in this embodiment are the same as their counterparts in embodiments disclosed in FIGS. 2A and 2B and will not be repeated.

Figure 3:
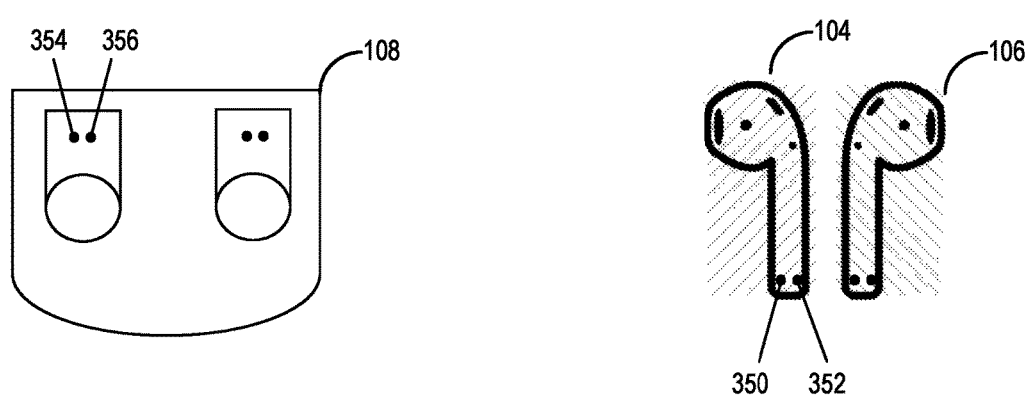
FIG. 3 is a block diagram illustrating another exemplary wireless audio system in accordance with an embodiment.

FIG. 3 illustrates a detailed block diagram of another exemplary wireless audio system 100 in FIG. 1 in accordance with an embodiment. In the example illustrated in FIG. 3, primary wireless headphone 104 may have a similar hardware structure as primary wireless headphone 104 in the example illustrated in FIG. 2A, 2B or 2C, and may additionally include a contact interface (e.g., contact points 350 and 352) configured to transmit to and/or receive from charging case 108 the communication parameters. Primary wireless headphone 104 may additionally include other components, such as an integrated circuit (e.g., a micro controller) configured to convert the communication parameters into electrical signals (e.g., a voltage or a current) when working as the communication parameter transmitting headphone, and convert the electrical signals back to the communication parameters when working as the communication parameter receiving headphone. For example, contact point 350 may be connected to the charge of the integrated circuit and contact point 352 may be connected to Ground. In some embodiments, the change of the voltage difference between contact points 350 and 352 may be used as the corresponding electrical signal for transmitting the communication parameters.

Different from the example illustrated in FIG. 2A, 2B or 2C, instead of using wireless module 240 for transmitting and/or receiving the communication parameters, charging case 108 may include a contact interface (e.g., contact points 354 and 356) configured to transmit the communication parameters to the communication parameter receiving headphone and receive the communication parameters from the communication parameter transmitting headphone. Similar to primary wireless headphone 104 in this example, charging case 108 may additionally include other components, such as an integrated circuit (e.g., a micro controller) configured to convert the received communication parameters into corresponding electrical signals (e.g., a voltage or a current) and transmit the corresponding electrical signals to the communication parameter receiving headphone. For example, contact point 354 may be connected to the charge of the integrated circuit and contact point 356 may be connected to Ground. In some embodiments, the change of the voltage difference of contact points 354 and 356 may be used as the corresponding electrical signal for transmitting the communication parameters.

In some embodiments, the contact interface of primary wireless headphone 104 (e.g., contact points 350 and 352) and the contact interface of charging case 108 (e.g., contact points 354 and 356) may be connected to each other. Along with the integrated circuits in primary wireless headphone 104 and charging case 108, the communication parameters can be communicated between primary wireless headphone 104 and charging case 108. For example, the integrated circuit in charging case 108 along with the integrated circuit in primary wireless headphone 104 may constitute a bidirectional half-duplex communication system when the interface of primary wireless headphone 104 and charging case 108 are connected, where primary wireless headphone 104 can communicate with charging case 108 in both directions, but only one at a time. For example, when primary wireless headphone 104 works as the communication parameter transmission headphone, primary wireless headphone 104 may use the bidirectional half-duplex communication system to transmit the communication parameters to charging case 108. On the other hand, when primary wireless headphone 104 works as the communication parameter receiving headphone, charging case 108 may use the bidirectional half-duplex communication system to transmit the communication parameters to primary wireless headphone 104.

It is contemplated that the contact interface of primary wireless headphone 104 and charging case 108 are not limited to the way as illustrated in FIG. 3. For example, contact interface of primary wireless headphone 104 and charging case 108 may each include more than 2 contact points (e.g., 3, 4, 5 or more contact points), and may be in a bar shape or a donut shape that can match each other, or may be in any suitable format of contact interfaces that can transmit current when contacting each other.

Secondary wireless headphone 106 may have the same hardware structure as primary wireless headphone 104 and may switch between the communication parameter transmitting headphone and the communication parameter receiving headphone by control module 220 of primary wireless headphone 104 and/or control module 234 of secondary wireless headphone 106.

Figure 4A:
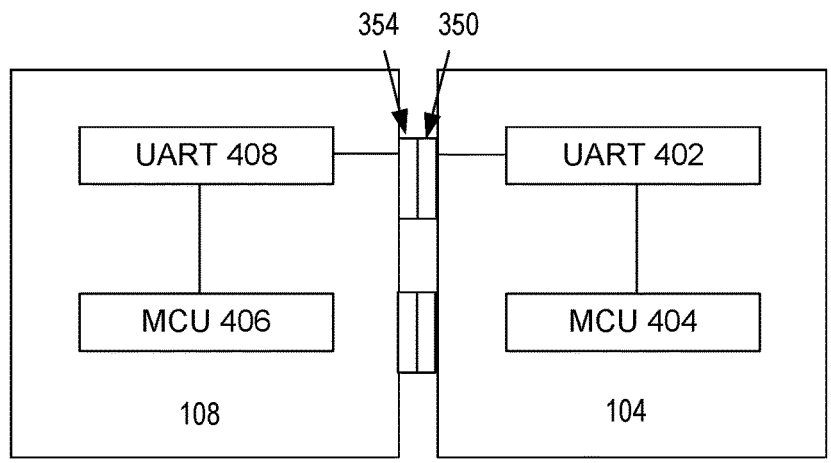
FIGS. 4A-4C are block diagrams illustrating exemplary charging case and wireless headphone connections in accordance with various embodiments.
Figure 4B:
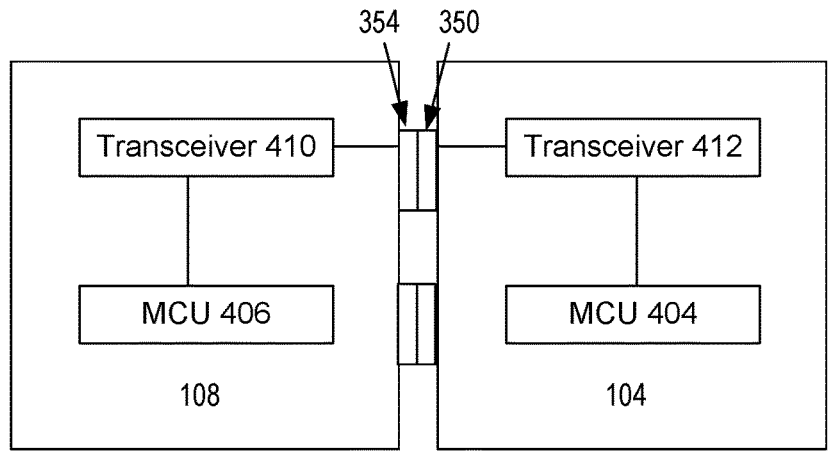
Figure 4C:
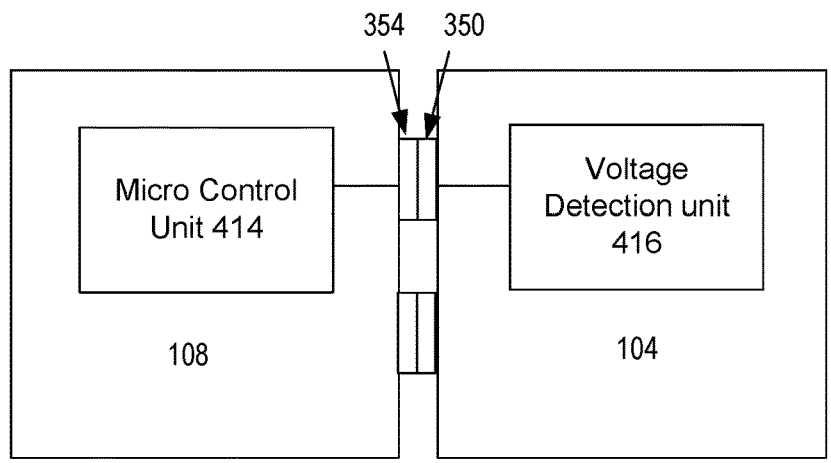

FIGS. 4A-4C are block diagrams illustrating exemplary wired communication between primary wireless headphone 104 and charging case 108 as illustrated in FIG. 3 in accordance with various embodiments.

In some embodiments, as illustrated in FIG. 4A, primary wireless headphone 104 and charging case 108 may respectively have a microcontroller unit (MCU) 404 and 406. MCUs 404 and 406 may process the communication parameters. In some embodiments, primary wireless headphone 104 and charging case 108 may also respectively have a Universal Asynchronous Receiver/Transmitter (UART) 402 or 408 for data transmission. MCU 404 and 406 may communicate with UART 402 and 408 respectively using data bus (e.g., transmit data in a parallel form) and UART 402 and 408 may transmit the data between primary wireless headphone 104 and charging case 108 in serial (e.g., the transmitting UART may add a start bit, a parity bit, and a stop bit when generating the data packet). For example, contact points 350 and 352 of primary wireless headphone 104 may respectively be connected to a transmitting pin and a receiving pin of UART 402. Contact points 354 and 356 of charging case 108 may respectively be connected to a transmitting pin and a receiving pin of UART 408. In some embodiments, contact points 350, 352, 354 and 356 may be used for charging primary wireless headphone 104. For example, contact points 350 and 352 may be connected to a battery of primary wireless headphone 104 and contact points 354 and 356 may be connected to a power supply (e.g., another battery or a power inverter) such that the power supply of charging case 108 may provide electrical power to the battery of primary wireless headphone 104.

The processed data may be communicated directly in serial between UART 402 and UART 408. For example, the processed data may be transmitted from the transmitting pin of UART 402 (e.g., connected to contact point 350 of primary wireless headphone 104) to the receiving pin of UART 408 (e.g., connected to contact point 354 of charging case 108). Because data transmitted between UARTs 402 and 408 are in an asynchronous manner, in some embodiments, the transmitting UART may add start and stop bits to the data packet. Upon receiving the start bit, the receiving UART may start to read the incoming bits at a specific frequency. In some embodiments, UARTs 402 and 408 are communicated in a bidirectional half-duplex mode where primary wireless headphone 104 can communicate with charging case 108 in both directions, but only one at a time.

In another example as illustrated in FIG. 4B, primary wireless headphone 104 and charging case 108 may respectively have an MCU 404 and 406 similar to the example illustrated in FIG. 4A. Primary wireless headphone 104 and charging case 108 may communicate with each other in an amended bidirectional half-duplex communication mode which will be disclosed in detail in FIG. 5. For example, primary wireless headphone 104 and charging case 108 may respectively include a transceiver 410 and 412 and transceiver 410 and 412 may define the amended bidirectional half-duplex communication mode and communicate with each other for transmitting the communication parameters based on the amended bidirectional half-duplex communication mode.

In a further example as illustrated in FIG. 4C, primary wireless headphone 104 and charging case 108 may use a micro control unit 414 and a voltage detection unit 416 for transmitting the communication parameters. For example, micro control unit 414 may convert the communication parameters into a serial of voltages, transmit the serial of voltages to contact point 354 and voltage detection unit 416 may receive the serial of voltages using contact point 350 and convert the serial of voltages back to the communication parameters.

Figure 5:
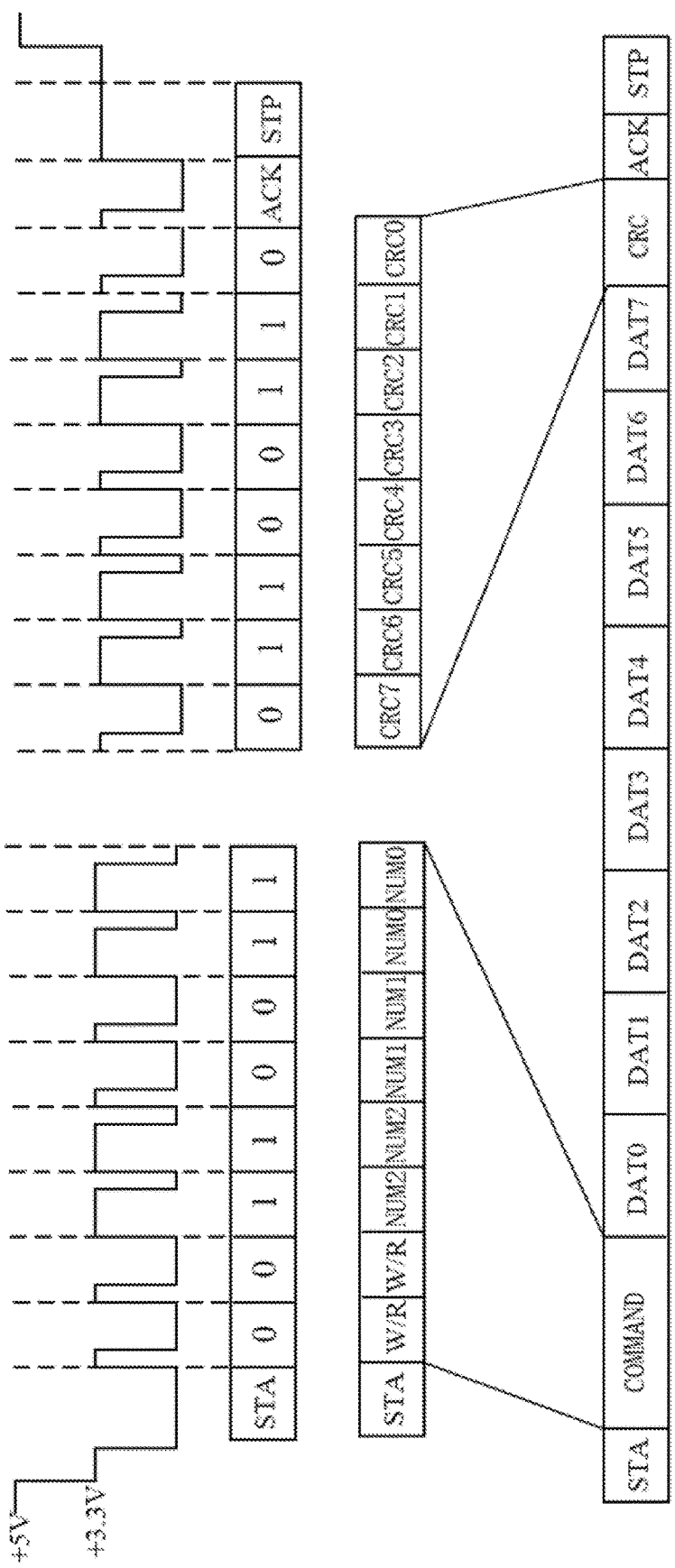
FIG. 5 is a block diagram illustrating an exemplary amended bidirectional half-duplex communication data packet in accordance with an embodiment.

FIG. 5 is a block diagram illustrating an exemplary amended bidirectional half-duplex communication mode used by transceivers 410 and 412 for the communication parameters transmission in accordance with an embodiment. In some embodiments, transceivers 410 and 412 may use a serial of high and low voltages (e.g., forming a waveform signal) to transmit the communication parameters (e.g., to create data packets). In some embodiments, a data packet corresponding to the communication parameters may include a start, a command, a Cyclic Redundancy Check (CRC), a serial of voltages (e.g., a serial of waveform signals) representing the communication parameters, acknowledgment (ACK) and a stop. For example, a start of the waveform signal (e.g., the starter of the data packet) may be a low voltage (1 bit), and a stop of the waveform signal may be a high voltage (1 bit). The serial of waveform signals may be transmitted between contact point 354 and 350. In some embodiment, each data packet may include 8 bits (a BYTE) of data and 1 bit of CRC for checking if the communication parameters have been transmitted properly (e.g., if the check is succeeded the reminder of CRC may be 0).

In some embodiments, the communication parameters are transmitted separately from the audio information. In some other embodiments, charging case 108 may additionally receive audio information through communication with the communication parameter transmitting headphone. For example, charging case 108 may use the contact interface (e.g., contact points 354 and 356) to charge primary wireless headphone 104 while receiving the audio information from primary wireless headphone 104. The same mechanism may be used for charging secondary wireless headphone 106 and will not be repeated. The communication between charging case 108 and primary wireless headphone 104 (e.g., the transmission of the audio information) may be simultaneously conducted while the charging process is ongoing. Charging case 108 may play the audio information while charging primary wireless headphone 104.

In another embodiment, charging case 108 may include a Hall switch used for detecting the open and close of the charging case. When the Hall switch determines that the charging case is opened, charging case 108 may use the contact interface (e.g., contact points 354 and 356) to transmit control signals to primary and secondary wireless headphone 104 and 106. Upon receiving the control signal, primary and secondary wireless headphone 104 and 106 may turn on their power and start to pair with audio source 102. In this case, when a user opens the charging case and takes primary and secondary wireless headphone 104 and 106 out of charging case 108, primary and secondary wireless headphone 104 and 106 had already paired with audio source 102 without the notice of the user. This may increase the intelligence of the wireless headphone system and improve the user experience.

Figure 6A:
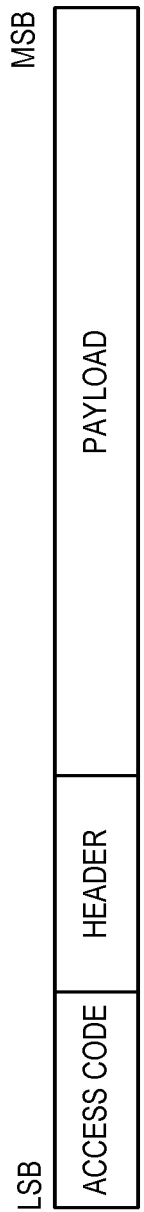
FIGS. 6A and 6B are depictions of exemplary BLUETOOTH audio data packets in accordance with various embodiments.
Figure 6B:
Figure 7:
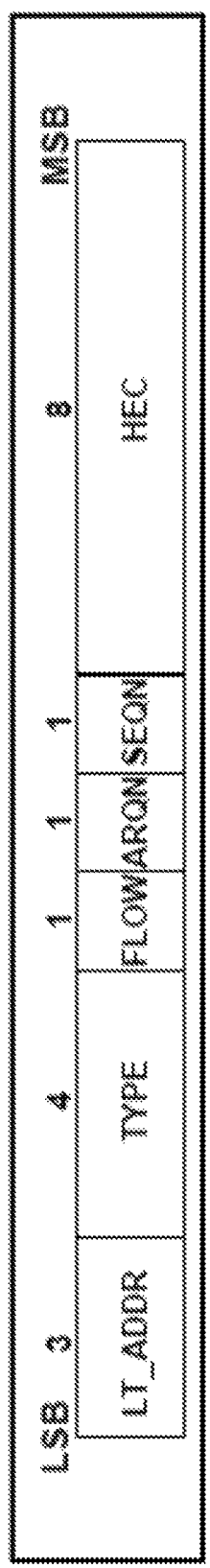
FIG. 7 is a depiction of a header of an exemplary packet in accordance with an embodiment.

FIGS. 6A and 6B are depictions of exemplary BLUETOOTH audio data packets in accordance with various embodiments. In some embodiments, audio information may be transmitted using BLUETOOTH audio data packets. Both BLUETOOTH audio data packets in FIGS. 6A and 6B include an access code, a header, and a payload in which the actual audio information is coded. As described above, FIG. 7 illustrates an example of a header in a BLUETOOTH audio data packet. FIG. 6B illustrates an enhanced data rate BLUETOOTH audio data packet, which further includes guard, synchronization, and trailer fields. The payload of the enhanced data rate BLUETOOTH audio data packet may be transmitted at a higher symbol rate than the standard BLUETOOTH symbol rate by using different modulation technique (DPSK) than the header (GFSK). As described above, the ECC can be coded based on the actual audio information in the payload of a BLUETOOTH audio data packet using RS code, BCH code, etc.

Figure 8:
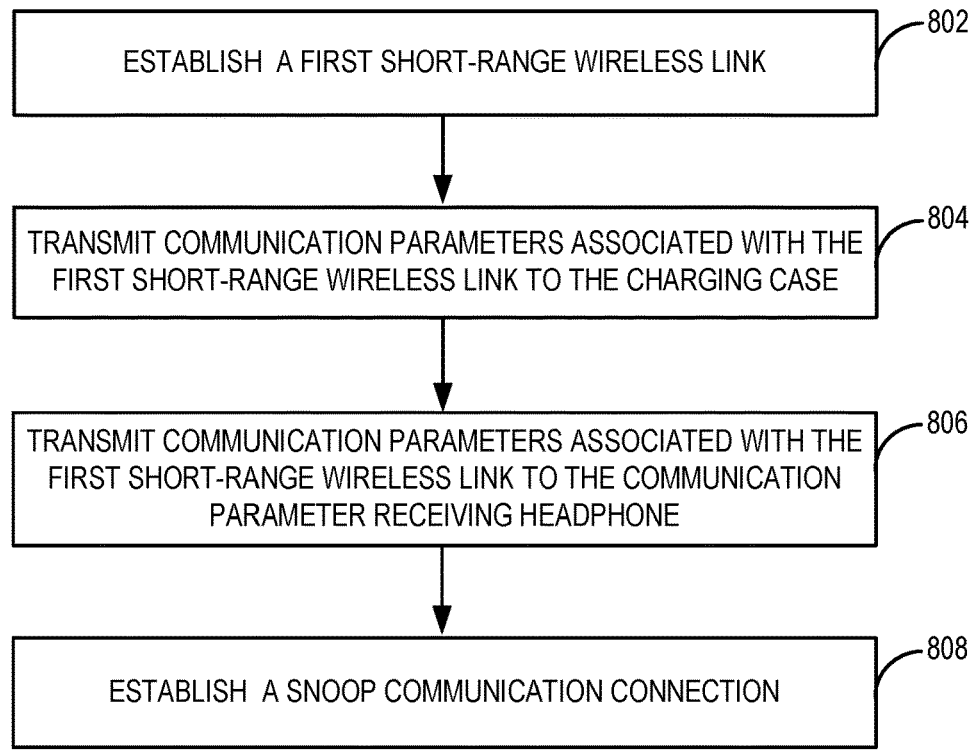
FIG. 8 is a flow chart illustrating an exemplary method for wirelessly communicating audio information in accordance with an embodiment.

FIG. 8 is a flow chart illustrating an exemplary method 800 for wirelessly communicating audio information in accordance with an embodiment. Method 800 can be performed by processing logic that can comprise hardware (e.g., circuitry, dedicated logic, programmable logic, microcode, etc.), software (e.g., instructions executing on a processing device), or a combination thereof. It is to be appreciated that not all operations may be needed to perform the disclosure provided herein. Further, some of the operations may be performed simultaneously, or in a different order than shown in FIG. 8, as will be understood by a person of ordinary skill in the art.

Method 800 shall be described with reference to FIGS. 1A and 1C, 2A-2C, and 3. However, method 800 is not limited to that exemplary embodiment. In method 800, communication parameters associated with the normal communication link is transmitted from the communication parameter transmitting headphone (e.g., primary wireless headphone 104) to the communication parameter receiving headphone (e.g., secondary wireless headphone 106) through charging case 108.

Starting at 802, a first type of short-range wireless connection, such as a BLUETOOTH connection, is established with an audio source. In some embodiments, the short-range wireless connection is established between primary wireless headphone 104 and audio source 102. At 804, communication parameters associated with the short-range wireless connection are transmitted to charging case 108 from a communication parameter headphone (e.g., primary wireless headphone 104). The communication parameters are transmitted separately from the audio information. In some embodiments, the communication parameters are transmitted from the communication parameter transmitting headphone (e.g., primary wireless headphone 104) to charging case 108 using the first type of short-range wireless communication, such as BLUETOOTH communication, or a second type of short-range wireless communication, such as WiFi communication or NFMI communication or a wired communication (e.g., through the connection of the contact interfaces of charging case 108 and primary wireless headphone 104 as disclosed in details in FIGS. 3 and 4A-4C). At 806, communication parameters are transmitted from charging case 108 to the communication parameter receiving headphone (e.g., secondary wireless headphone 106). In some embodiments, the communication parameters are transmitted using the first type of short-range wireless communication, such as BLUETOOTH communication, or the second type of short-range wireless communication, such as WiFi communication or NFMI communication or a wired communication (e.g., through the connection of the contact interfaces of charging case 108 and secondary wireless headphone 106). At 808, the communication parameter receiving headphone may establish a snoop communication connection (e.g., the same type of short-wireless connection as the short-wireless connection between primary wireless headphone 104 and audio source 102) with audio source 102 based on the communication parameters received from charging case 108 and start receiving/snooping the same audio information received by primary wireless headphone 104.

Figure 9:
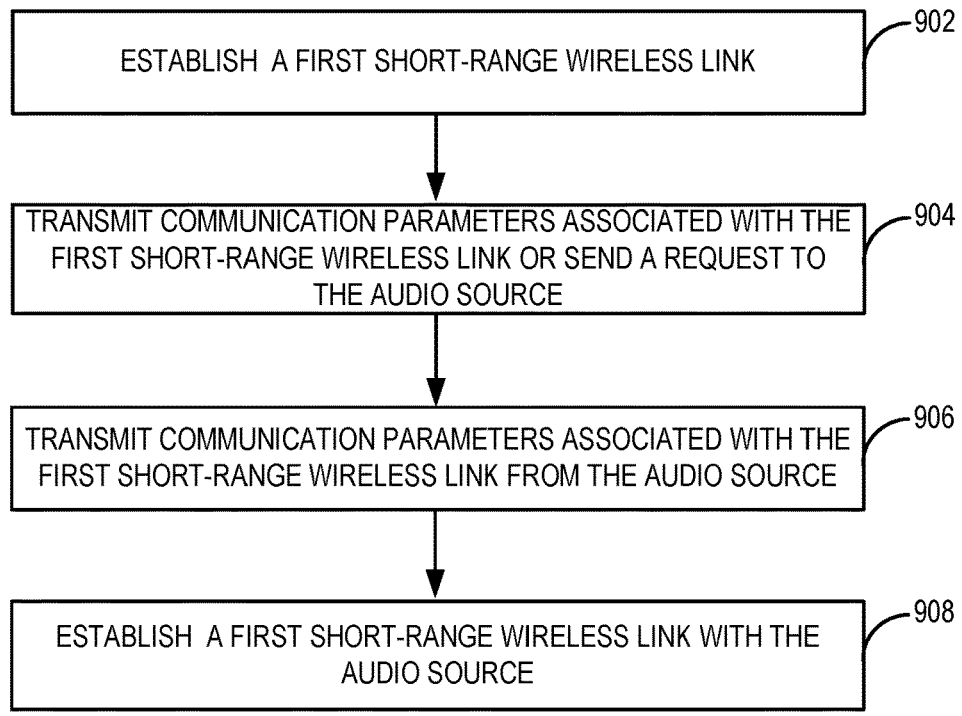
FIG. 9 is a flow chart illustrating another exemplary method for wirelessly communicating audio information in accordance with an embodiment.

FIG. 9 is a flow chart illustrating an exemplary method 900 for wirelessly communicating audio information in accordance with an embodiment. Method 900 can be performed by processing logic that can comprise hardware (e.g., circuitry, dedicated logic, programmable logic, microcode, etc.), software (e.g., instructions executing on a processing device), or a combination thereof. It is to be appreciated that not all operations may be needed to perform the disclosure provided herein. Further, some of the operations may be performed simultaneously, or in a different order than shown in FIG. 9, as will be understood by a person of ordinary skill in the art.

Method 900 shall be described with reference to FIG. 1B. However, method 900 is not limited to that exemplary embodiment. In method 900, communication parameters associated with the normal communication link is transmitted from the communication parameter transmitting headphone (e.g., primary wireless headphone 104) to the communication parameter receiving headphone (e.g., secondary wireless headphone 106) through audio source 102. Starting at 902, a first type of short-range wireless connection such as a BLUETOOTH connection, is established between the communication parameter transmitting headphone (e.g., primary wireless headphone 104) and an audio source (e.g., audio source 102). In some embodiments, the short-range wireless connection is established between primary wireless headphone 104 and audio source 102. At 904, communication parameters associated with the short-range wireless connection are transmitted to audio source 102 from the communication parameter headphone (e.g., primary wireless headphone 104). The communication parameters are transmitted separately from the audio information. In some embodiments, the communication parameters are transmitted from the communication parameter transmitting headphone (e.g., primary wireless headphone 104) to audio source 102 using the first type of short-range wireless communication, such as BLUETOOTH communication, or a second type of short-range wireless communication, such as WiFi communication or NFMI communication. In some other embodiments, primary wireless headphone 104 may instead, send a request to audio source 102 requesting audio source 102 to transmit the communication parameters to secondary wireless headphone 106. For example, audio source 102 may store the communication parameters associated with the short-range wireless connection established between primary wireless headphone 104 and audio source 102 and may at 906, transmit the communication parameters to secondary wireless headphone 106 in response to receiving the request from primary wireless headphone 104 requesting audio source 102 to transmit the communication parameters to secondary wireless headphone 106. At 906, communication parameters are transmitted from audio source 102 to the communication parameter receiving headphone (e.g., secondary wireless headphone 106). For example, audio source 102 may broadcast the communication parameters to secondary wireless headphone 106. In some embodiments, the communication parameters are transmitted using the first type of short-range wireless communication, such as BLUETOOTH communication, or the second type of short-range wireless communication, such as WiFi communication or NFMI communication. At 908, the communication parameter receiving headphone may establish a snoop communication connection (e.g., the same type of short-wireless connection as the short-wireless connection between primary wireless headphone 104 and audio source) with audio source 102 based on the communication parameters received from audio source 102 and start receiving/snooping the same audio information received by primary wireless headphone 104.

Figure 10A:
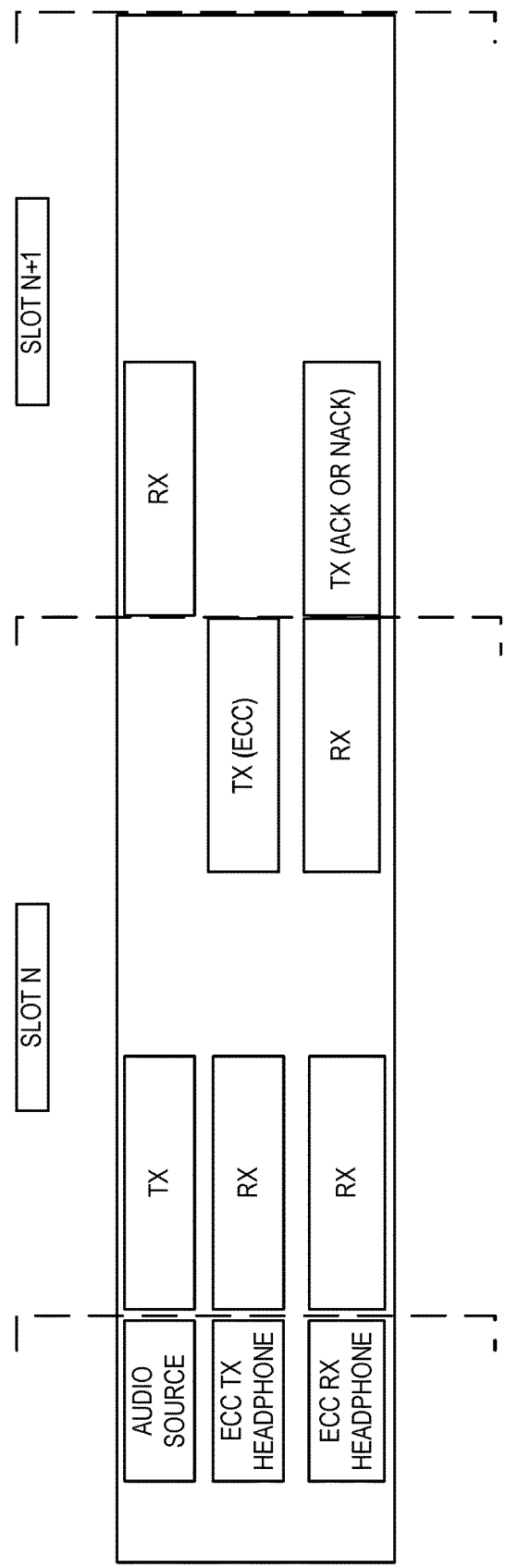
FIGS. 10A and 10B are timing diagrams of exemplary wireless audio systems in accordance with various embodiments.
Figure 10B:
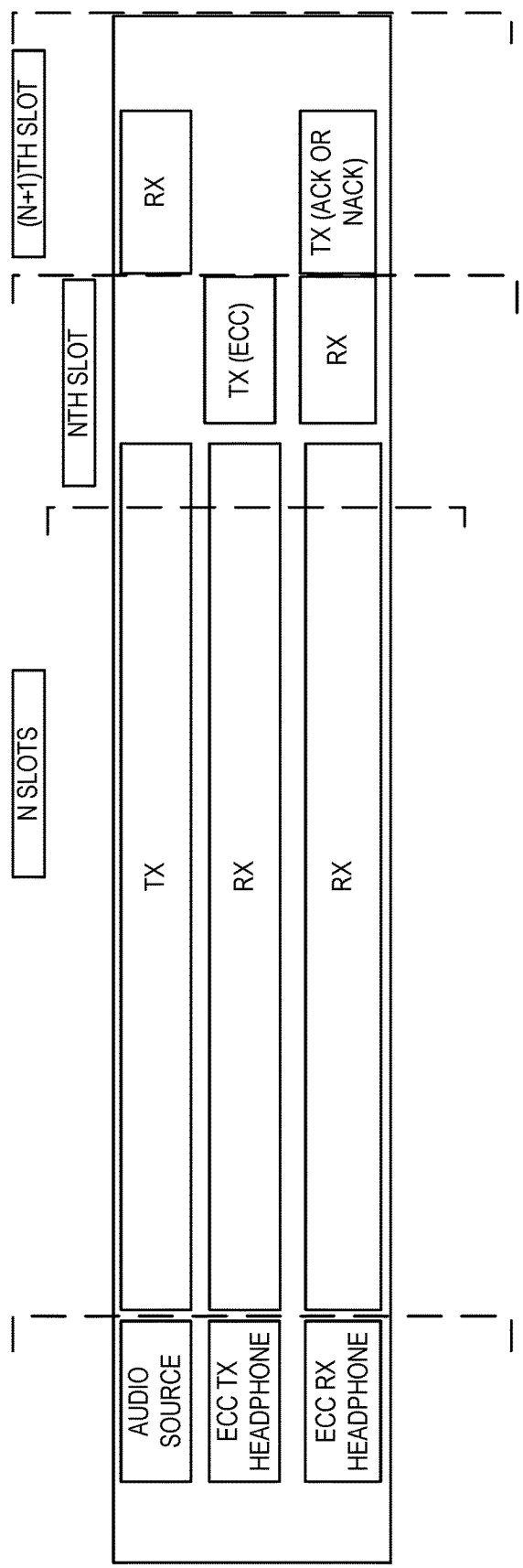

FIGS. 10A and 10B are timing diagrams of exemplary wireless audio systems in accordance with various embodiments. As described above, error correcting messages may be transmitted from an ECC transmitting headphone to an ECC receiving headphone. As described above, in some embodiments, each of the time slots (e.g., N and N+1) has the same duration, for example, 625 μs for BLUETOOTH communication. As shown in FIG. 10A, in a first time slot (N), the audio source transmits an audio data packet (e.g., a BLUETOOTH audio data packet), and each of the ECC transmitting and receiving headphones receives the audio data packet. In the same time slot (N), the ECC transmitting headphone transmits an error correcting message including an ECC or a pseudo error correcting message without an ECC depending on whether the ECC transmitting headphone successfully receives the audio data packet in time slot (N). In the same time slot (N), the ECC receiving headphone receives the error correcting message or pseudo error correcting message from the ECC transmitting headphone. For example, ECC transmitting headphone and ECC receiving headphone may use any of the short-range wireless communications or wired communications disclosed above for transmitting the ECC.

In a second time slot (N+1) immediately subsequent to the first time slot (N), the ECC receiving headphone may transmit an ACK message or a NACK message to the audio source depending on whether it successfully receives the audio data packet based on the error correcting message in the first time slot (N). In a first situation, if in the first time slot (N), the ECC receiving headphone receives the error correcting message including the ECC from the ECC transmitting headphone and corrects the error in the audio data packet based on the ECC (i.e., successfully receiving the audio data packet after the correction), then in the second time slot (N+1), the ECC receiving headphone transmits an ACK message to the audio source. In a second situation, if in the first time slot (N), the ECC receiving headphone receives the error correcting message including the ECC from the ECC transmitting headphone and does not find any error in the audio data packet (i.e., successfully receiving the audio data packet without the correction), then in the second time slot (N+1), the ECC receiving headphone transmits an ACK message to the audio source as well. In a third situation, if in the first time slot (N), the ECC receiving headphone receives the error correcting message including the ECC from the ECC transmitting headphone and fails to correct the error in the audio data packet using the ECC (i.e., not successfully receiving the audio data packet), then in the second time slot (N+1), the ECC receiving headphone transmits a NACK message to the audio source. In a fourth situation, if in the first time slot (N), the ECC receiving headphone receives the pseudo error correcting message without the ECC from the ECC transmitting headphone or does not receive any error correcting message (i.e., not successfully receiving the error correcting message including the ECC), then in the second time slot (N+1), the ECC receiving headphone transmits a NACK message to the audio source as well.

In some embodiments, if in the first time slot (N), the ECC transmitting headphone does not successfully receive the audio data packet from the audio source, then in the second time slot (N+1), the ECC transmitting headphone transmits an ACK message to the audio source as well.

It is understood that in FIG. 10A, each audio data packet is transmitted within a single time slot, e.g., the first time slot (N), for example, according to BLUETOOTH Hands Free Profile (HFP). In the time slot in which the audio data packet is transmitted by the audio source, the audio data packet and the error correcting message can share the same time slot. For example, the audio data packet may be transmitted prior to the error correcting message in the same time slot. In some embodiments, each audio data packet can be transmitted within multiple time slots, for example, according to BLUETOOTH A2DP. As shown in FIG. 10B, the audio data packet is transmitted from the audio source to each of the ECC transmitting and receiving headphones in N slots, and the error correcting message or pseudo error correcting message is transmitted from the ECC transmitting headphone to the ECC receiving headphone at the end of the last one of N slots (Nth slot). That is, at least part of the audio data packet is transmitted in the same slot (Nth slot) as the error correcting message. Similar to the example in FIG. 10A, in a time slot immediately subsequent to the last one of N slots, e.g., (N+1)th slot, the ECC receiving headphone transmits an ACK message or a NACK message to the audio source as described above in detail.

It is further understood that in some embodiments, the error correcting message may be transmitted in more than one time slot. In the case in which the audio data packet and the error correcting message are transmitted in N time slots (e.g., 3 or 5 time slots), the specific numbers of time slots within the N time slots used for transmitting the respective audio data packet and the error correcting message are not limited as long as the audio data packet is transmitted prior to the error correcting message in the N time slots. Thus, the error correcting message may be transmitted in the last one or more time slots of the N time slots.

In some embodiments, another type of error correcting message without an ECC may be transmitted from the ECC transmitting headphone to the ECC receiving headphone when the ECC transmitting headphone successfully receives the header of the audio data packet but fails to receive the payload of the audio data packet. As described above, the ECC can be coded based on the actual audio information in the payload of a BLUETOOTH audio data packet using RS code, BCH code, etc.

It is to be appreciated that the Detailed Description section, and not the Summary and Abstract sections, is intended to be used to interpret the claims. The Summary and Abstract sections may set forth one or more but not all exemplary embodiments of the present disclosure as contemplated by the inventor(s), and thus, are not intended to limit the present disclosure or the appended claims in any way.

While the present disclosure has been described herein with reference to exemplary embodiments for exemplary fields and applications, it should be understood that the present disclosure is not limited thereto. Other embodiments and modifications thereto are possible, and are within the scope and spirit of the present disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments may perform functional blocks, steps, operations, methods, etc. using orderings different than those described herein.

The breadth and scope of the present disclosure should not be limited by any of the above-described exemplary embodiments, but should be defined only in accordance with the following claims and their equivalents.

What is claimed is:

1. A wireless audio system, comprising:
a pair of first and second wireless headphones; and
a charging case configured to charge the first and second wireless headphones, wherein the first wireless headphone is configured to:
    establish, with an audio source, a first short-range wireless connection; and
    transmit communication parameters associated with the first short-range wireless connection to the charging case;
the charging case is configured to:
    receive the communication parameters associated with the first short-range wireless connection; and
    transmit the communication parameters associated with the first short-range wireless connection to the second wireless headphone; and
the second wireless headphone is configured to:
    receive the communication parameters associated with the first short-range wireless connection; and
    establish, with the audio source, a second short-range wireless connection based on the communication parameters associated with the first short-range wireless connection.

2. The wireless audio system of claim 1, wherein
the first wireless headphone is configured to receive audio information from the audio source via the first short-range wireless connection; and
the second wireless headphone is configured to snoop the audio information via the second short-range wireless connection.

3. The wireless audio system of claim 1, the first and second short-range wireless connections are based on a same first type of short-range wireless communication.

4. The wireless audio system of claim 3, wherein at least one of (i) the first wireless headphone transmits the communication parameters to the charging case, or (ii) the charging case transmits the communication parameters to the second wireless headphone, based on a second type of short-range wireless communication different from the first type of short-range wireless communication.

5. The wireless audio system of claim 4, wherein the first and second types of short-range wireless communication comprise at least one of BLUETOOTH communication, BLUETOOTH Low Energy communication, amended BLUETOOTH communication, or Wi-Fi communication.

6. The wireless audio system of claim 1, wherein at least one of (i) the first wireless headphone transmits the communication parameters to the charging case, or (ii) the charging case transmits the communication parameters to the second wireless headphone, based on a wired communication.

7. The wireless audio system of claim 1, wherein the communication parameters comprise at least one of an IP address or media access control (MAC) address of the audio source, or encryption parameters between the first wireless headphone and the audio source.

8. The wireless audio system of claim 5, wherein in response to the first wireless headphone re-establishing the first short-range wireless connection with the audio source, at least one of the first wireless headphone or the charging case is further configured to transmit encryption parameters of the re-established first short-range wireless connection.

9. The wireless audio system of claim 1, wherein the communication parameters are transmitted separately from the audio information.

10. A wireless audio system, comprising:
a pair of first and second wireless headphones; and
a charging case configured to charge the first and second wireless headphones, wherein the first wireless headphone comprises:
    a first wireless module configured to establish, with an audio source, a first short-range wireless connection; and
    a second wireless module configured to transmit communication parameters associated with the first short-range wireless connection to the charging case;
the charging case comprises a third wireless module configured to:
    receive the communication parameters associated with the first short-range wireless connection from the second wireless module of the first wireless headphone; and
    transmit the communication parameters associated with the first short-range wireless connection to the second wireless headphone based on a first type of short-range wireless communication; and
the second wireless headphone comprises:
    a fourth wireless module configured to receive the communication parameters associated with the first short-range wireless connection from the third wireless module of the charging case using the first type of short-range wireless communication; and
    a fifth wireless module configured to establish, with the audio source, a second short-range wireless connection based on the communication parameters associated with the first short-range wireless connection.

11. The wireless audio system of claim 10, wherein:
the first wireless module of the first wireless headphone is configured to receive audio information from the audio source via the first short-range wireless connection; and
the fifth wireless module of the second wireless headphone is configured to snoop the audio information via the second short-range wireless connection.

12. The wireless audio system of claim 10, wherein the first and second short-range wireless connections are based on a second type of short-range wireless communication different from the first type of short-range wireless communication.

13. The wireless audio system of claim 12, wherein
the first type of short-range wireless communication is BLUETOOTH communication, BLUETOOTH Low Energy communication, amended BLUETOOTH communication, or Wi-Fi communication; and
the second type of short-range wireless communication is BLUETOOTH communication.

14. The wireless audio system of claim 10, wherein the third wireless module of the charging case is further configured to broadcast the communication parameters based on the first type of short-range wireless communication.

15. The wireless audio system of claim 10, wherein the third wireless module of the charging case is further configured to transmit the communication parameters to the fourth wireless module of the second wireless headphone in a one-to-one mode based on the first type of short-range wireless communication.

16. A wireless audio system, comprising:
a pair of first and second wireless headphones; and
a charging case configured to charge the first and second wireless headphones, wherein the first wireless headphone comprises:
a first wireless module configured to establish, with an audio source, a first short-range wireless connection; and
a first contact interface configured to transmit communication parameters associated with the first short-range wireless connection to the charging case based on a wired communication;
the charging case comprises:
a second contact interface in contact with the first contact interface and configured to receive the communication parameters associated with the first short-range wireless connection from the first wireless headphone based on the wired communication; and
a third contact interface configured to transmit the communication parameters associated with the first short-range wireless connection to the second wireless headphone based on the wired communication; and
the second wireless headphone comprises:
a fourth contact interface in contact with the third contact interface and configured to receive the communication parameters associated with the first short-range wireless connection from the charging case based on the wired communication; and
a second wireless module configured to establish, with the audio source, a second short-range wireless connection based on the communication parameters associated with the first short-range wireless connection.

17. The wireless audio system of claim 16, wherein
the first wireless headphone is configured to receive audio information from the audio source via the first short-range wireless connection; and
the second wireless headphone is configured to snoop the audio information via the second short-range wireless connection.

18. The wireless audio system of claim 16, wherein the first and second short-range wireless connections are based on a same type of short-range wireless communication.

19. The wireless audio system of claim 16, wherein
the first wireless headphone is configured to convert the communication parameters into a corresponding electrical signal; and
the second wireless headphone is configured to convert the corresponding electrical signal into the communication parameters.

20. The wireless audio system of claim 16, wherein the second contact interface and the third contact interface of the charging case are further configured to charge the first wireless headphone and the second wireless headphone, respectively.

21. The wireless audio system of claim 16, wherein the wired communication is a bidirectional half-duplex communication.

22. The wireless audio system of claim 16, wherein the charging case further comprises a memory configured to store the communication parameters.

23. A method for wirelessly communicating audio information, comprising:
establishing, by a first wireless headphone, a first short-range wireless connection with an audio source;
transmitting, by the first wireless headphone, communication parameters associated with the first short-range wireless connection to a charging case;
transmitting by the charging case, the communication parameters associated with the first short-range wireless connection to a second wireless headphone; and
establishing, by the second wireless headphone, a second short-range wireless connection with the audio source based on the received communication parameters associated with the first short-range wireless connection.

24. The method of claim 23, wherein the first and second short-range wireless connections are based on a same first type of short-range wireless communication.

25. The method of claim 23, wherein at least one of (i) transmitting the communication parameters to the charging case, or (ii) transmitting the communication parameters to the second wireless headphone, are based on a second type of short-range wireless communication different from the first type of short-range wireless communication.

26. The method of claim 23, wherein at least one of (i) transmitting the communication parameters to the charging case, or (ii) transmitting the communication parameters to the second wireless headphone, are based on a wired communication.

* * * * *